(12) United States Patent
Kim et al.

(10) Patent No.: US 10,164,767 B2
(45) Date of Patent: Dec. 25, 2018

(54) DEVICE FOR GENERATING TRANSMISSION CLOCK OF SINK AND TRANSMISSION METHOD USING GENERATED TRANSMISSION CLOCK

(71) Applicant: Doestek, Anyang-si (KR)

(72) Inventors: Tae Jin Kim, Seongnam-si (KR); Dae Jung Shin, Gunpo-si (KR)

(73) Assignee: Doestek, Anyang-Si, Gyeonggi-Do (KR)

( * ) Notice: Subject to any disclaimer, the term of this patent is extended or adjusted under 35 U.S.C. 154(b) by 0 days.

(21) Appl. No.: 15/028,601

(22) PCT Filed: Aug. 26, 2014

(86) PCT No.: PCT/KR2014/007948
§ 371 (c)(1),
(2) Date: Apr. 11, 2016

(87) PCT Pub. No.: WO2015/056877
PCT Pub. Date: Apr. 23, 2015

(65) Prior Publication Data
US 2016/0308668 A1    Oct. 20, 2016

(30) Foreign Application Priority Data

Oct. 18, 2013 (KR) .................. 10-2013-0124877
Oct. 21, 2013 (KR) .................. 10-2013-0125481
Aug. 5, 2014 (KR) .................. 10-2014-0100640

(51) Int. Cl.
*H04L 7/02* (2006.01)
*G06F 1/04* (2006.01)
(Continued)

(52) U.S. Cl.
CPC ............. *H04L 7/041* (2013.01); *G06F 1/04* (2013.01); *H04B 1/40* (2013.01); *H04L 7/0087* (2013.01);
(Continued)

(58) Field of Classification Search
CPC ... H04B 1/38; H04B 1/40; H04B 1/44; H04B 1/48; H04L 7/0079; H04L 7/0087;
(Continued)

(56) References Cited

U.S. PATENT DOCUMENTS 5,631,757 A * 5/1997 Bodeep .............. H04L 5/1423
                                                              370/276
7,486,718 B2 * 2/2009 Sutardja .............. G06F 13/405
                                                              375/215
(Continued)

FOREIGN PATENT DOCUMENTS

KR    10-1998-0026038 A    7/1998
KR    10-2000-0056356 A    9/2000
(Continued)

OTHER PUBLICATIONS

International Search Report and Written Opinion mailed Oct. 8, 2014 for Application No. PCT/KR2014/007948.

*Primary Examiner* — Betsy Deppe
(74) *Attorney, Agent, or Firm* — Wolf, Greenfield & Sacks, P.C.

(57) ABSTRACT

A semiconductor device for generating a transmission clock in a sink without a reference clock and a method of transmitting data from the sink to a source by use of the generated transmission clock are provided. The sink may include: a receiver configured to generate a digital control oscillator code by using a phase difference between a reception clock of a data signal received from a source and a recovered clock and configured to recover data from the data signal by using the recovered clock recovered by the generated digital control oscillator code; and a transmitter configured to generate a transmission clock by the digital control oscillator (Continued)

code having the recovered clock locked to the reception clock and configured to transmit return data to the source by using the transmission clock when a return data request identifier is received from the source.

20 Claims, 18 Drawing Sheets

(51) Int. Cl.
*H04B 1/40* (2015.01)
*H04L 7/04* (2006.01)
*H04L 7/00* (2006.01)
*H04L 7/033* (2006.01)

(52) U.S. Cl.
CPC ............... *H04L 7/02* (2013.01); *H04L 7/033* (2013.01); *H04L 7/04* (2013.01)

(58) Field of Classification Search
CPC ... H04L 7/02; H04L 7/04; H04L 7/041; H04L 7/0091; H04L 7/033; H04L 7/0331; G06F 1/04; H03L 7/089; H03L 7/095; H03L 7/0991
USPC ........................................................ 375/219
See application file for complete search history.

(56) References Cited

U.S. PATENT DOCUMENTS

| | | | |
|---|---|---|---|
| 8,165,260 B2* | 4/2012 | Nagaraj | H03K 23/667 375/376 |
| 9,240,772 B2* | 1/2016 | Drago | H03K 3/012 |
| 2003/0035504 A1 | 2/2003 | Wong et al. | |
| 2005/0193290 A1* | 9/2005 | Cho | G01R 31/31709 714/710 |
| 2006/0280276 A1* | 12/2006 | Chen | H03L 7/095 375/376 |
| 2007/0285082 A1 | 12/2007 | Kimura et al. | |
| 2008/0165841 A1* | 7/2008 | Wall | H03L 7/08 375/232 |
| 2009/0323566 A1* | 12/2009 | Lin | H04L 5/1469 370/286 |
| 2011/0013545 A1 | 1/2011 | Kim et al. | |
| 2011/0090998 A1* | 4/2011 | Zhang | H03L 7/093 375/365 |
| 2011/0285527 A1* | 11/2011 | Arms | B64C 27/006 340/539.1 |
| 2012/0139587 A1* | 6/2012 | Drago | H03K 3/012 327/106 |
| 2012/0275494 A1* | 11/2012 | Ma | H04B 1/0475 375/219 |
| 2013/0315349 A1* | 11/2013 | Nguyen | H04L 7/0016 375/340 |
| 2015/0015343 A1* | 1/2015 | Ballantyne | H03L 7/0991 331/36 C |

FOREIGN PATENT DOCUMENTS

KR 10-2006-0129425 A 12/2006
KR 10-2009-0026890 A 3/2009

* cited by examiner

DEVICE FOR GENERATING TRANSMISSION CLOCK OF SINK AND TRANSMISSION METHOD USING GENERATED TRANSMISSION CLOCK

CROSS-REFERENCE TO RELATED APPLICATIONS

This application is the National Phase under 35 U.S.C. § 371 of PCT International Application No. PCT/KR2014/007948, filed Aug. 26, 2014, which claims priority to Korean Application No. 10-2013-0124877, filed Oct. 18, 2013; and Korean Application No. 10-2013-0125481, filed Oct. 21, 2013; and Korean Application No. 10-2014-0100640, filed Aug. 5, 2014, the entire contents of the aforementioned applications are hereby incorporated herein by reference.

BACKGROUND

1. Technical Field

The present invention relates to a semiconductor device, more specifically to a device for generating a transmission clock in a sink without a reference clock and a method of transmitting data from the sink to a source by use of the generated transmission clock.

2. Background Art

With an increased speed of data transmission, a source now transmits a clock and data at the same time, and a sink now recovers and uses the clock. In this high-speed communication method, a clock data recovery (CDR) of the sink is responsible for recovering the clock and aligning the phase of the recovered clock. Although high-speed data transmission is possible from the source to the sink, the source and the sink communicate through one or more unidirectional channels. Some communication methods include a unidirectional channel, which transmits the data from the sink to the source, or a bidirectional channel between the source and the sink. Nevertheless, the data transmission speed of the bidirectional channel is relatively lower than that of the unidirectional channel. Besides, both the source and the sink have to each include a configuration for generating an additional transmission clock for bidirectional data transmission. While a reference clock is usually provided to the source, it is often uncertain whether a reference clock is provided to the sink. Accordingly, when a sink is produced, it is imperative that the sink is designed to prepare for the absence of a reference clock. Moreover, if the number of channels is increased, it becomes difficult to arrange the large number of channels efficiently.

The related arts are disclosed in U.S. Pat. No. 7,263,153 and U.S. Pat. No. 7,839,965.

SUMMARY

A unidirectional channel may be utilized as a bidirectional channel. When data transmission is required from a sink to a source, data may be transmitted by utilizing the unidirectional channel as a bidirectional channel. In such a case, a transmission clock may be provided without introducing a complicated configuration in the sink.

When the unidirectional channel is utilized as the bidirectional channel, a transmission method between the sink and the source may be simplified. When data is transmitted from the sink to the source, the data may be communicated by phase-matching only, without a clock recovery process.

The sink in accordance with an aspect of the present invention transmits return data by generating a transmission clock without a reference clock. The sink may include: a receiver configured to generate a digital control oscillator code by using a phase difference between a reception clock of a data signal received from a source and a recovered clock and configured to recover data from the data signal by using the recovered clock recovered by the generated digital control oscillator code; and a transmitter configured to generate a transmission clock by the digital control oscillator code having the recovered clock locked to the reception clock and configured to transmit return data to the source by using the transmission clock when a return data request identifier is received from the source.

The receiver may include: a digital phase detector configured to detect the phase difference between the reception clock of the data signal received from the source and the recovered clock; a time-to-digital converter configured to generate the digital control oscillator code by using the phase difference detected by the digital phase detector; and a first digital control oscillator configured to output the recovered clock by using the digital control oscillator code.

The receiver may include: a linear phase detector configured to detect the phase difference between the reception clock of the data signal received from the source and the recovered clock; a charge pump configured to convert the phase difference detected by the linear phase detector into a control voltage; an analog-to-digital converter configured to convert the control voltage into the digital control oscillator code; and a first digital control oscillator configured to output the recovered clock by using the digital control oscillator code.

The transmitter may include: a second digital control oscillator configured to output the transmission clock by using the digital control oscillator code; and a serializer configured to serialize the return data by using the transmission clock.

The sink may further include a lock detector configured to compare the reception clock with the recovered clock and output a locking detection signal indicating whether the first digital control oscillator is locked.

The return data may include a header and option data and may further include a mini training pattern. The return data may be a no return data identifier.

The data signal received from the source and the return data may be transmitted through a same channel.

According to another aspect of the present invention, a method of transmitting data between a source, which transmits data by using a reference clock, and a sink, which transmits data by generating a transmission clock without a reference clock, includes: outputting the transmission clock by using a reception clock of a data signal received from the source, the transmission clock being outputted by a digital control oscillator included in a transmitter of the sink; and changing a direction of data transmission between the source and the sink and transmitting return data to the source by using the transmission clock, when a return data request identifier is received from the source.

The outputting of the transmission clock by using the reception clock of the data signal received from the source may include: generating a digital control oscillator code by using a phase difference between the reception clock of the data signal received from the source and a recovered clock; outputting the recovered clock by using the digital control oscillator code, the recovered clock being outputted by a digital control oscillator included in a receiver of the sink; comparing the reception clock with the recovered clock and determining whether the digital control oscillator included in the receiver of the sink is locked; and providing the digital control oscillator code to the digital control oscillator included in the transmitter of the sink when the digital control oscillator included in the receiver of the sink is locked.

The return data may be transmitted in a return data transmission section and may include a mini training pattern. The return data may include a header and option data. Moreover, the return data may include a no return data identifier.

The return data request identifier may include a transmission completion identifier.

The return data may have a variable size.

The method may further include, after the changing of the direction of data transmission between the source and the sink and transmitting the return data to the source by using the transmission clock when a return data request identifier is received from the source, transmitting a transmission completion identifier to the source when the transmission of the return is completed.

In accordance with the present invention summarized above, a unidirectional channel may be utilized as a bidirectional channel. When data transmission is required from the sink to the source, data may be transmitted by utilizing the unidirectional channel as a bidirectional channel. In such a case, the transmission clock may be provided without introducing a complicated configuration in the sink.

When the unidirectional channel is utilized as the bidirectional channel, the transmission method between the sink and the source may be simplified. Although the sink does not transmit a transmission clock, the step of recovering the clock may be omitted when data is transmitted from the sink to the source, and the data may be communicated by phase-matching only.

BRIEF DESCRIPTION OF DRAWINGS

Hereinafter, the present disclosure will be described with reference to certain embodiments illustrated in the accompanying drawings. To help understanding of the present disclosure, a same reference numeral is assigned to identical elements, throughout the accompanying drawings. The configurations illustrated in the accompanying drawings are mere examples embodied to illustrate and describe the present disclosure and by no means shall restrict the scope of the present disclosure.

DETAILED DESCRIPTION

Since there can be a variety of permutations and embodiments of the present invention, certain embodiments will be illustrated and described in detail with reference to the accompanying drawings. This, however, is by no means to restrict the present invention to certain embodiments, and shall be construed as including all permutations, equivalents and substitutes covered by the technical ideas and scope of the present invention.

Figure 1:
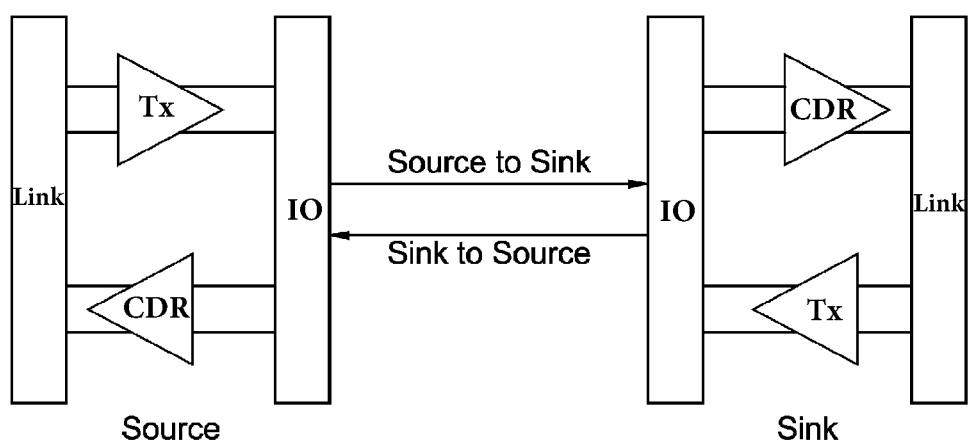
FIG. 1 illustrates an example of the configuration of a source and a sink.

FIG. 1 illustrates an example of the configuration of a source and a sink.

The source and the sink are electrically connected with each other through a channel, and the source transmits a data signal to the sink. The source transmits the data signal in high speed through a single channel, and the sink uses a clock recovered from the data signal to generate a transmission clock and uses the generated transmission clock to transmit return data to the source.

The source and the sink each include a transmitter and a receiver. The receiver of the source and the receiver of the sink are each a clock and data recovery (CDR), which recovers a clock and data from the data signal, and the transmitter of the sink generates a transmission clock that has a substantially same frequency as that of the clock recovered by the CDR. The receiver of the source is capable of recovering the data and/or the clock from the return data. Since the clock used for transmitting the data signal and the transmission clock are substantially the same, the source may have a clock recovery process omitted or simplified.

The return data is transmitted from the sink to the source in a time window during which no data is transmitted from the source (hence, "return data transmission section" hereinafter). The return data transmission section starts when the source notifies the sink that transmission of data signal is completed or when the source requests the sink for transmission of return data. The return data transmission section ends when the sink notifies the source that transmission of return data is completed or when the sink notifies the source there is no return data to transmit. During the return data transmission section, the direction of data transmission is changed in the channel so that data may be transmitted by the sink only. Although depending on the application, the return data transmission section may occur at least once while data signals are communicated between the source and the sink. The length of the return data transmission section may vary depending on the size of return data.

The return data transmission section is relatively shorter than a section in which data signals are transmitted. Nevertheless, by configuring the size of the return data to be smaller than the return data transmission section, bidirectional communication may be possible simultaneously without affecting a data transmission efficiency between the source and the sink. Even if the return data is bigger than the return data transmission section, the return data may be split-transmitted using a following return data transmission section, thereby little affecting the data transmission efficiency between the source and the sink. Moreover, if the return data is bigger than the return data transmission section, the transmission speed of data may be increased.

Figure 2:
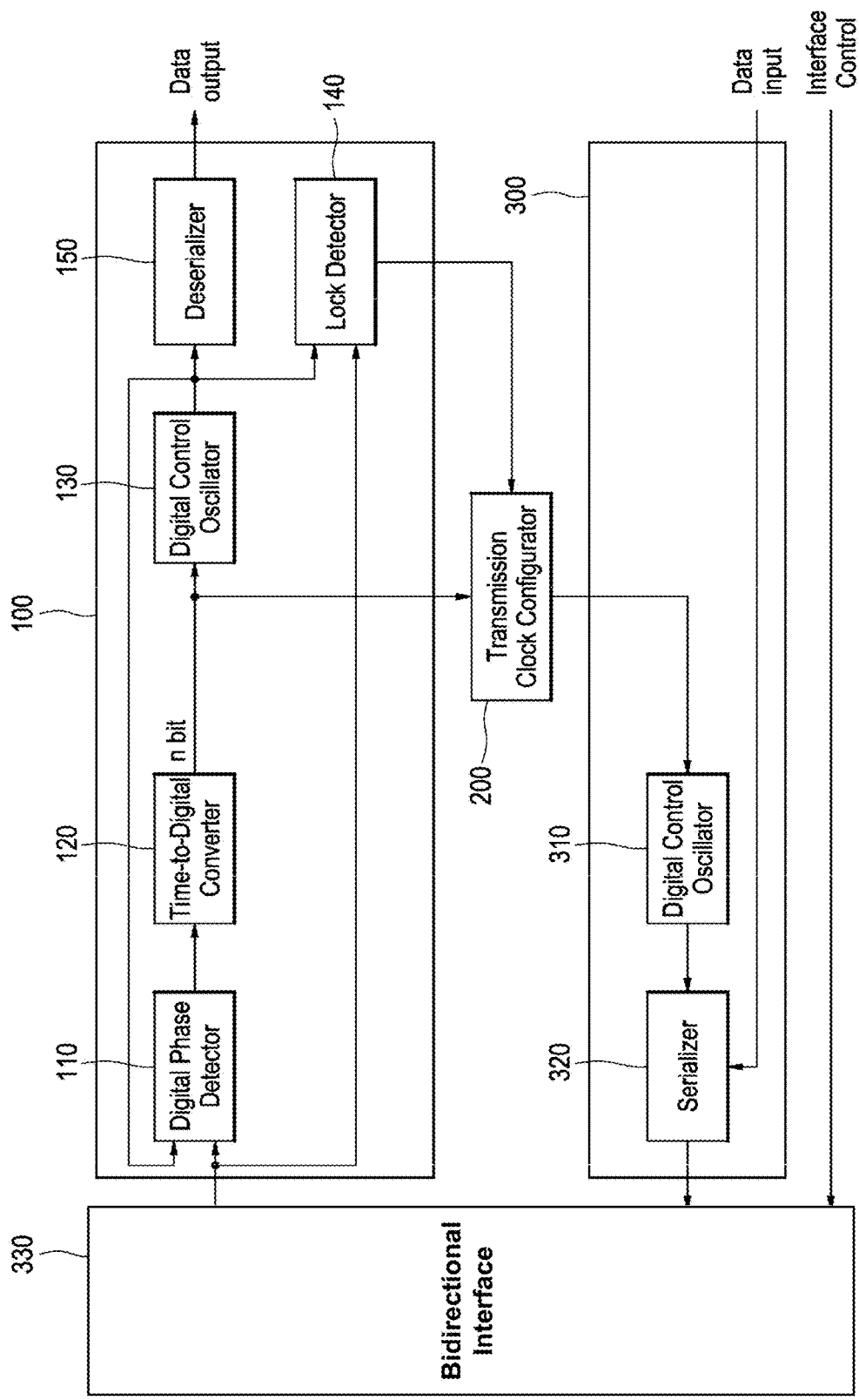
FIG. 2 illustrates an example of device for generating a clock of a sink.

FIG. 2 illustrates an example of device for generating a clock of a sink.

Referring to FIG. 2, the sink is mainly constituted with a receiver 100 and a transmitter 300 and electrically communicably connected with a source through a bidirectional interface. The receiver 100 generates a digital control oscillator code using a phase difference between a reception clock and a recovered clock of a data signal received from the source, and recovers data from the data signal using the recovered clock, which is recovered by the generated digital control oscillator code. The transmitter 300 generates a transmission clock using the digital control oscillator code, in which the recovered clock is locked to the reception clock, and transmits return data to the source using the transmission clock.

The device for generating a clock of a sink includes a digital phase detector 110, a time-to-digital converter 120, a first digital control oscillator 130, a lock detector 140, a transmission clock configurator 200 and a second digital control oscillator 310.

The digital phase detector 110 detects a phase difference between the reception clock and the recovered clock. By comparing a phase of the reception clock of the data signal inputted through the bidirectional interface with a phase of the clock recovered using the reception clock, a detected phase difference is outputted to indicate whether the phase of the recovered clock is behind or ahead of the reception clock. Here, the data signal may include at least one of a main training pattern or a mini training pattern. The digital phase detector 110 may be a non-linear detector such as, for example, Alexander Phase Detector, Oversampled Phase Detector or Bang-Bang Phase Detector. Compared to a linear phase detector, which compares the phase difference of a recovered clock with an inputted data signal and generates an up signal pulse (UP) and a down signal pulse (DN) having a width in proportion to the phase difference, the non-linear phase detector may ignore information about the size of a phase error and output the polarity of the phase error.

The time-to-digital converter 120 is connected to an output terminal of the digital phase detector 110 and converts the detected phase difference to a digital control oscillator code. For example, the detected phase difference may be outputted in various forms such as, for example, UP/DN, Early/Late and Error/Ref, to indicate whether the phase of the recovered clock is ahead of or behind the phase of the reception clock, and the time-to-digital converter 120 coverts the detected phase difference to the digital control oscillator code, which is a digital signal having n bits, n being a natural number. Therefore, digital control oscillator codes having different values may be continuously outputted until the first digital control oscillator 130 is locked. Once the first digital control oscillator 130 is locked, the time-to-digital converter 120 may output a constant digital control oscillator code.

The first digital control oscillator 130 is connected to an output terminal of the time-to-digital converter 120 and outputs the recovered clock that is recovered using the digital control oscillator code. The first digital control oscillator 130 has the frequency of the clock increased or decreased according to the n bits of digital control oscillator code. For example, if a digital control oscillator code having 9 bits is used, the digital control oscillator may output a clock having a maximum of 512 different frequencies.

Meanwhile, the digital control oscillator may be designed to have various configurations. For example, the digital control oscillator may be configured by combining a digital-to-analog converter, or configured in a way that the output of the oscillator is directly controlled using a digital input as a switch. It shall be also appreciated that the digital control oscillator may be realized using various ways.

The lock detector 140 is connected to an output terminal of the first digital control oscillator 130 and determines whether the first digital control oscillator 130 is locked. The lock detector 140 compares the reception clock with the recovered clock that is recovered by the first digital control oscillator 130 to output a locking detection signal if locking is occurred. For instance, if a rising edge of the reception clock is compared and found to be matched with a rising edge of the recovered clock, the lock detector 140 may determine that locking has occurred. In another example, the lock detector 140 may determine the locking by counting the number of matched phases of the rising edges of the reception clock and the recovered clock. It shall be appreciated that the locking may be determined using other various ways.

Although it is illustrated in FIG. 2 that the lock detector 140 is placed in the receiver 100, the location of the lock detector 140 is not necessarily limited to what is illustrated herein. Moreover, although it is illustrated that the locking detection signal is directly provided to the transmission clock configurator 200 from the lock detector 140, this is merely an example for the convenience of understanding, and the locking detection signal may be provided by itself or with a control signal by way of a control circuit (not shown) of the sink.

A deserializer 150 deserializes a serial data signal inputted through the bidirectional interface using the recovered clock. Here, the data signal may include a return data request identifier REQUEST, with which the source requests the sink to transmit the return data. The return data request identifier REQUEST may include a transmission completion identifier DONE, which indicates that the source has completed transmitting the data. Here, the source may transmit the return data request identifier REQUEST to the sink even though there still are data to be transmitted. The deserialized data is outputted to the control circuit of the sink. The control circuit of the sink does not only process the deserialized data but also control operations of the receiver 100, the transmission clock configurator 200 and the transmitter 300. Here, the control circuit of the sink transmits the return data to the source through the transmitter 300 by the return data request identifier REQUEST. Once the return data request identifier REQUEST is received, the control circuit of the sink may continue to receive data signals after transmitting the return data to the source. In the meantime, it is also possible that the control circuit of the sink generates the return data when the return data request identifier REQUEST is received the first time and then transmits the return data to the source when the return data request identifier REQUEST is received the second time.

The transmission clock configurator 200 is placed between the receiver 100 and the transmitter 300 and provides the digital control oscillator code to the second digital control oscillator 310 placed in the transmitter 300. The transmission clock configurator 200 may provide the digital control oscillator code to the second digital control oscillator 310 once the locking detection signal is received from the lock detector 140. In the meantime, in order to prevent power loss caused by the transmitter 300 or to prevent a noise from occurring in a transmission medium connected by the bidirectional interface, the control circuit of the sink may turn off the transmitter 300 during a receiving operation and turn off the receiver 100 during a transmitting operation. The transmission clock configurator 200 may be triggered by a combination of the locking detection signal and the control signal from the control circuit to provide the digital control oscillator code to the second digital control oscillator 310. An example and operation of the transmission clock configurator 200 will be described with reference to FIG. 8 and FIG. 9.

The second digital control oscillator 310 provides the transmission clock. The second digital control oscillator 310 outputs the transmission clock using a digital control oscillator code corresponding to the locking detection signal. For instance, The second digital control oscillator 310 and the first digital control oscillator 130 may have a same structure. Accordingly, triggered by a digital control oscillator code configured to have a locking detection signal outputted, the second digital control oscillator 310 and the first digital control oscillator 130 may output an identical clock.

A serializer 320 serializes and outputs the return data inputted by the control circuit. The outputted return data is transmitted to the source through the bidirectional interface. The control circuit of the sink transmits the return data to the source through the serializer 320. In the meantime, when there is no return data to transmit, the control circuit of the sink transmits a no return data identifier NO RETURN DATA to the source through the serializer 320. Here, the control circuit of the sink may transmit the transmission completion identifier DONE, which indicates that the return data transmission section is completed, together with the return data or with the no return data identifier NO RETURN DATA.

A bidirectional interface 330 controls a direction of data transmission between the source and the sink. The bidirectional interface 330 stops transmission of the return data from the sink to the source if a data signal is received from the source, and stops reception of data signals from the source to the sink if the return data is transmitted from the sink. The direction of data transmission of the bidirectional interface 330 is determined by the control signal of the control circuit of the sink. Here, the control circuit of the sink is triggered by the return data request identifier REQUEST received from the source to allow the bidirectional interface 330 to transmit the return data from the sink to the source. In addition, when the transmission of the return data is completed, the control circuit of the sink transmits the transmission completion identifier DONE to the source, and the bidirectional interface 330 allows the sink to receive the data signal. Similarly to the operation of the bidirectional interface of the sink, the bidirectional interface of the source changes the direction of data transmission according to the return data request identifier REQUEST.

Figure 3:
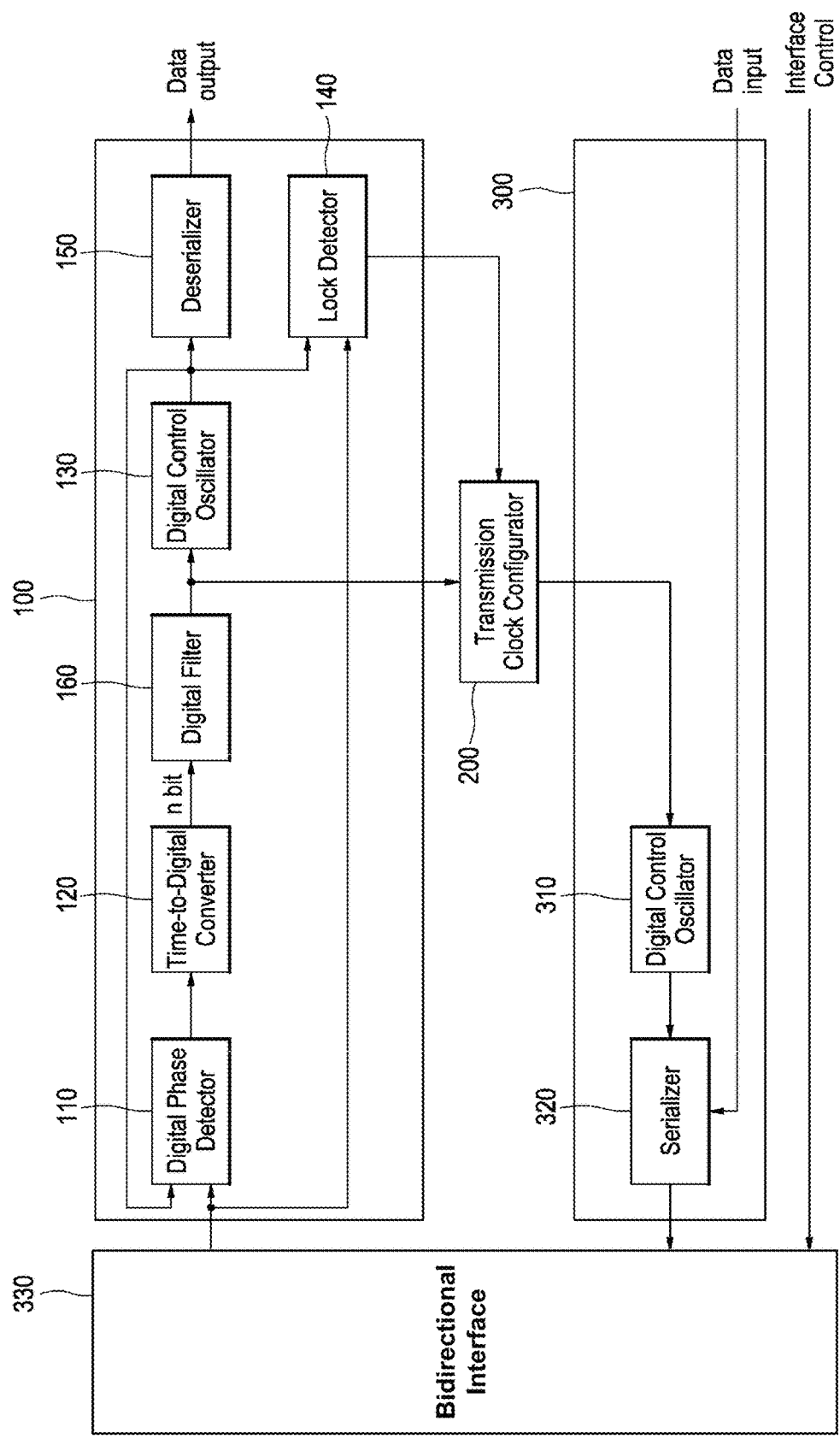
FIG. 3 illustrates another example of device for generating a clock of a sink.

FIG. 3 illustrates another example of device for generating a clock of a sink.

Referring to FIG. 3, the device for generating a clock of a sink includes a digital phase detector 110, a time-to-digital converter 120, a first digital control oscillator 130, a lock detector 140, a digital filter 160, a transmission clock configurator 200 and a second digital control oscillator 310. The elements described with reference to FIG. 2 will not be redundantly described herein.

Compared to FIG. 2, the device for generating a clock of a sink illustrated in FIG. 3 further includes the digital filter 160 placed between the time-to-digital converter 120 and the first digital control oscillator 130. The digital filter 160 filters the digital control oscillator code outputted from the time-to-digital converter 120 to a digital mode. Owing to the digital filter 160, jitter noise properties of the recovered clock and the transmission clock may be improved.

Figure 4:
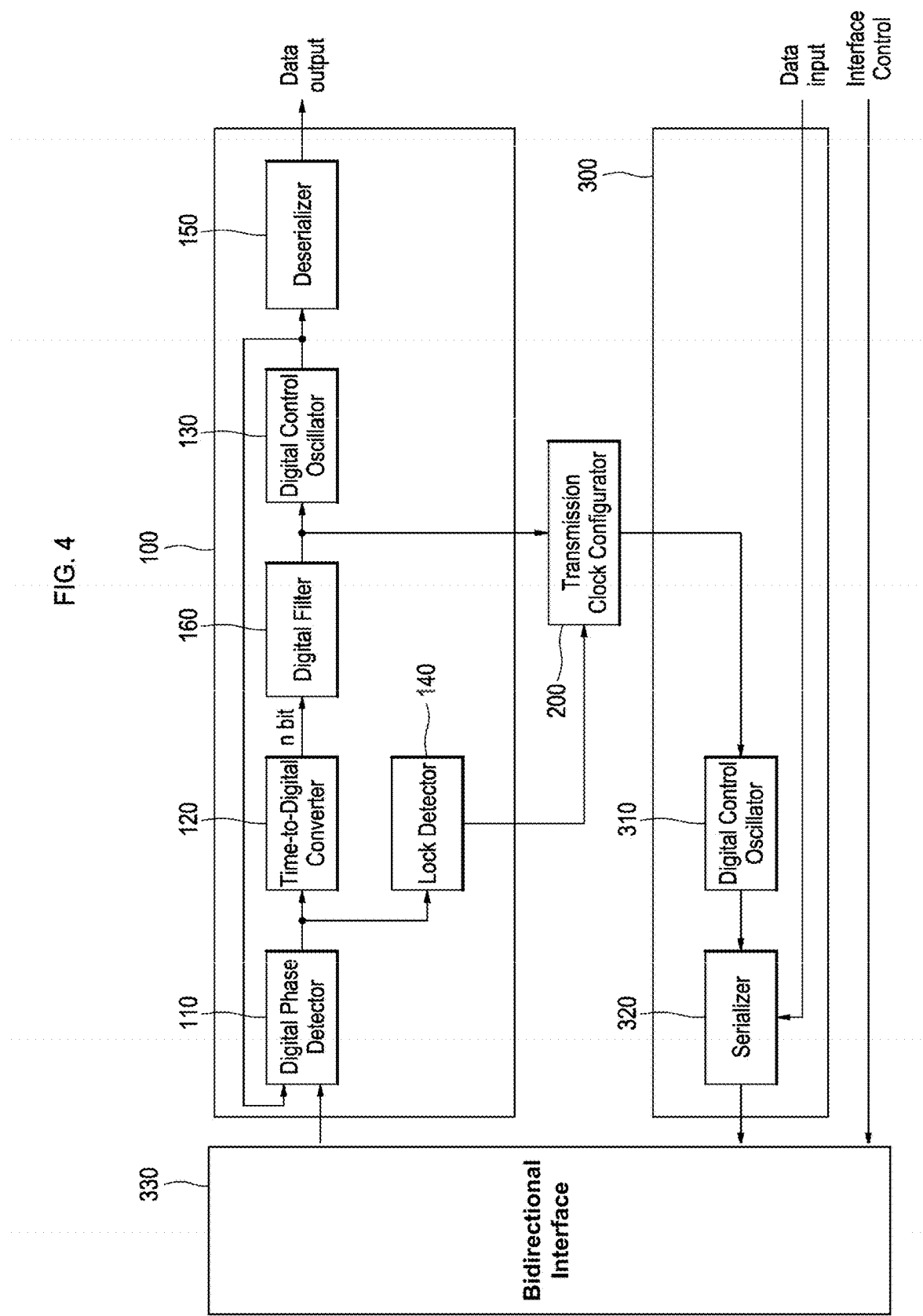
FIG. 4 illustrates yet another example of device for generating a clock of a sink.

FIG. 4 illustrates yet another example of device for generating a clock of a sink.

Referring to FIG. 4, the device for generating a clock of a sink includes a digital phase detector 110, a time-to-digital converter 120, a first digital control oscillator 130, a lock detector 140, a digital filter 160, a transmission clock configurator 200 and a second digital control oscillator 310. The elements described with reference to FIG. 2 will not be redundantly described herein.

The digital phase detector 110 detects a phase difference between the reception clock and the recovered clock. The phase difference outputted by digital phase detector 110 may be in various forms. For example, the phase difference may be a pulse indicating being fast/slow or a pulse indicating a reference/error. Regardless of the type of outputted phase difference, once the digital control oscillator 130 is locked, the detected value is maintained in a constant type. For example, in the case where a pulse indicating fast/slow is outputted, a fast pulse and a slow pulse may be outputted at the same time or outputted as very short pulses. The locking state may be expressed in various other forms. Accordingly, the lock detector 140 may determine whether locking has occurred or not using the type of phase difference outputted in the locking state.

Figure 5:
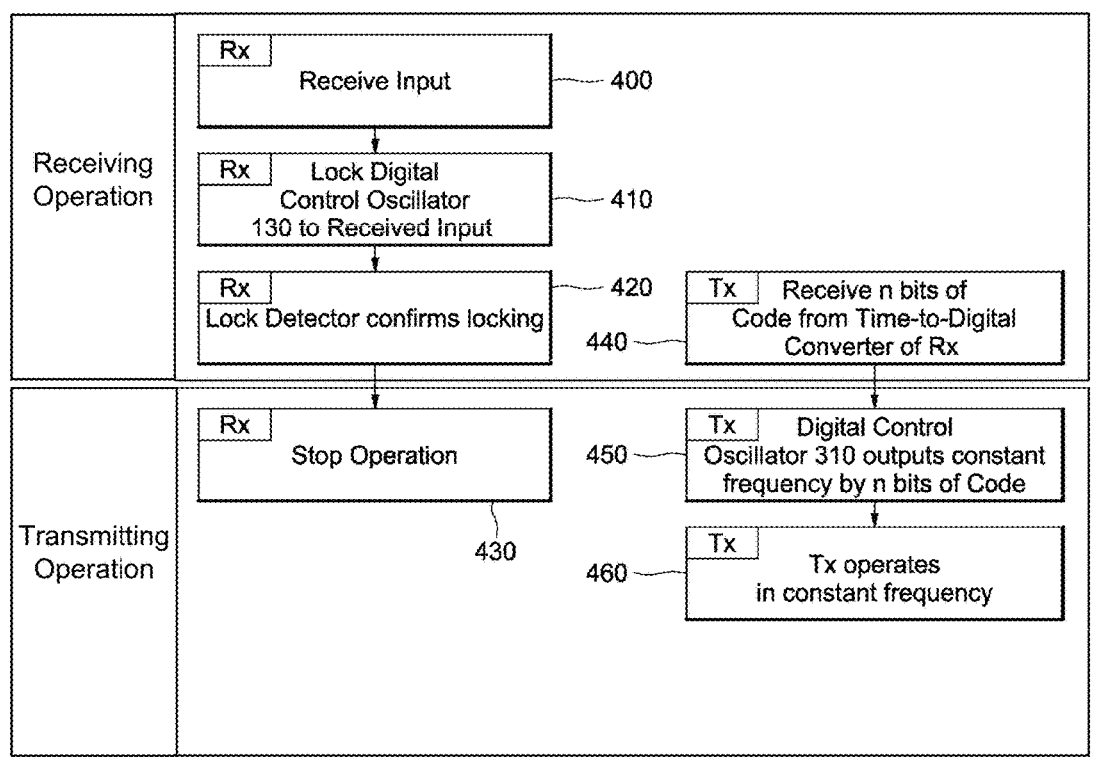
FIG. 5 illustrates an example of operation of the devices for generating a clock shown in FIG. 2 to FIG. 4.

FIG. 5 illustrates an example of operation of the devices for generating a clock shown in FIG. 2 to FIG. 4.

In the receiver 100, once a data signal is inputted through the bidirectional interface (400), the first digital control oscillator 130 operates to have the recovered clock locked to the reception clock of the inputted data signal (410). Once the reception clock and the recovered clock are locked to each other, the lock detector 140 outputs the locking detection signal (420). Later, while the transmitter is operating, the receiver 100 is turned off by a control of the control circuit (430).

In the transmitter 300, the n bits of digital control oscillator code corresponding to the locking detection signal are transferred to the second digital control oscillator 310 by the transmission clock configurator 200 (440). Afterwards, triggered by the n bits of digital control oscillator code, the second digital control oscillator 310 outputs the transmission clock having a constant frequency (450). The transmitter 300 transmits the return data to the source using the transmission clock (460).

In an embodiment, the transmitter 300 may be turned on and generate the transmission clock when the locking detection signal is outputted. In another embodiment, the transmitter 300 may be turned on only by the control of the control circuit even if the locking detection signal is outputted. In yet another embodiment, the transmitter 300 may be turned on only if the receiver 100 is turned off even if the locking detection signal is outputted. Therefore, although it is illustrated in FIG. 5 that the step 420 and the step 440 are performed at the same time, these steps may be performed at different times, depending on the embodiment. Similarly, the step 430 and the step 450 may not have to be necessarily performed at the same time.

Figure 6:
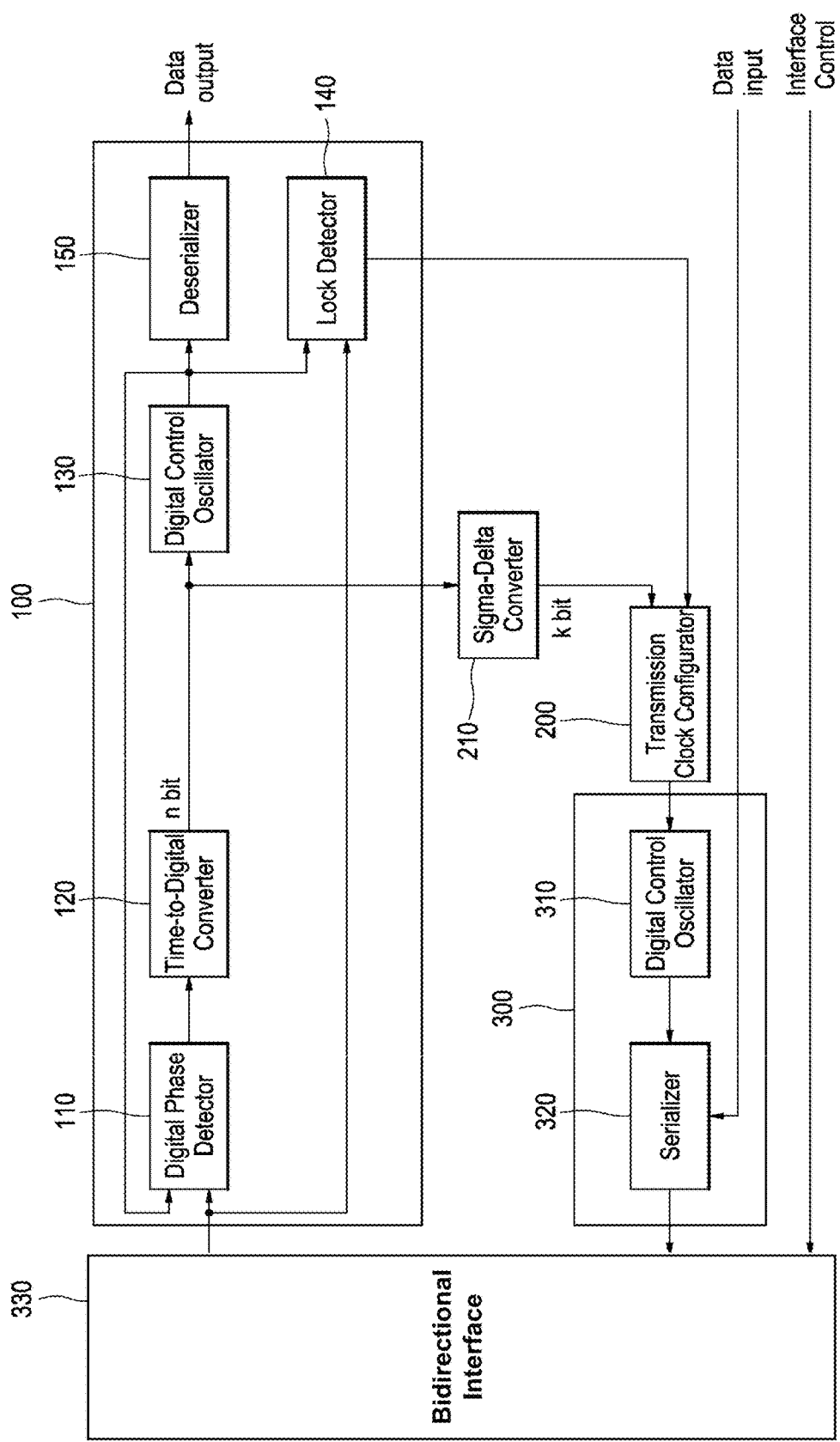
FIG. 6 illustrates still another example of device for generating a clock of a sink.

FIG. 6 illustrates still another example of device for generating a clock of a sink.

Referring to FIG. 6, the device for generating a clock of a sink includes a digital phase detector 110, a time-to-digital converter 120, a first digital control oscillator 130, a lock detector 140, a transmission clock configurator 200, a sigma-delta converter 210 and a second digital control oscillator 310. The elements described with reference to FIG. 1A will not be redundantly described herein.

Compared to FIG. 2, the device for generating a clock of a sink illustrated in FIG. 6 further includes the sigma-delta converter 210 placed between the time-to-digital converter 120 and the transmission clock configurator 200. The sigma-delta converter 210 accumulates digital control oscillator codes outputted from the time-to-digital converter 120 and outputs an average value. Specifically, the sigma-delta converter 210 changes the number of bits of the digital control oscillator code through an error feedback operation using a difference of two digital control oscillator codes. In the present embodiment, the sigma-delta converter 210 may output a digital control oscillator code having K bits, K being a natural number. Owing to the sigma-delta converter 210, jitter noise properties of the recovered clock and the transmission clock may be improved. In another embodiment, the sigma-delta converter 210 may be substituted with an accumulator.

Figure 7:
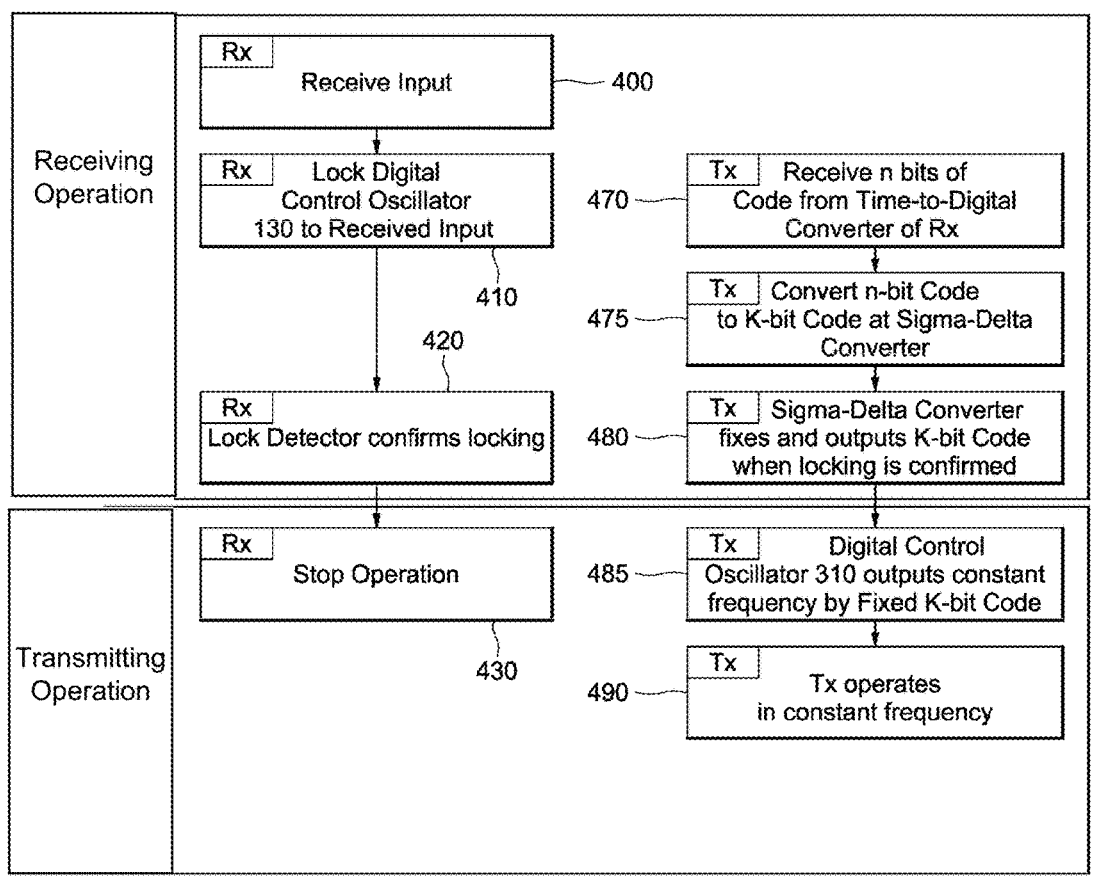
FIG. 7 illustrates an example of operation of the device for generating a clock shown in FIG. 6.

FIG. 7 illustrates an example of operation of the device for generating a clock shown in FIG. 6.

In the receiver 100, once a data signal is inputted through the bidirectional interface (400), the first digital control oscillator 130 operates to have the recovered clock locked to the reception clock of the inputted data signal (410). Once the reception clock and the recovered clock are locked to each other, the lock detector 140 outputs the locking detection signal (420). Later, while the transmitter is operating, the receiver 100 is turned off by a control of the control circuit (430).

In the transmitter 300, the n bits of digital control oscillator code corresponding to the locking detection signal are transferred to the sigma-delta converter 210 (470). In the present embodiment, the sigma-delta converter 210 accumulates the received n bits of digital control oscillator codes and calculates an average value to generate the K bits of digital control oscillator code (475). Once the locking detection signal is outputted, the sigma-delta converter 210 fixes and outputs the K bits of digital control oscillator code (480). Afterwards, triggered by the K bits of digital control oscillator code, the second digital control oscillator 310 outputs the transmission clock having a constant frequency (485). The transmitter 300 transmits the return data to the source using the transmission clock (490).

In an embodiment, the time required for obtaining the transmission clock may be reduced by operating the sigma-delta converter 210 during the receiving operation. In another embodiment, the sigma-delta converter 210 and the transmitter 300 may be turned on and generate the transmission clock when the locking detection signal is outputted. In yet another embodiment, the transmitter 300 may be turned on only by the control of the control circuit even if the locking detection signal is outputted. In still another embodiment, the transmitter 300 may be turned on only if the receiver 100 is turned off even if the locking detection signal is outputted. Therefore, although it is illustrated in FIG. 7 that the step 410 and the step 470 are performed at the same time, these steps may be performed at different times, depending on the embodiment. Similarly, the step 420 and the step 480, and the step 430 and the step 485, may not have to be necessarily performed at the same time.

Figure 8:
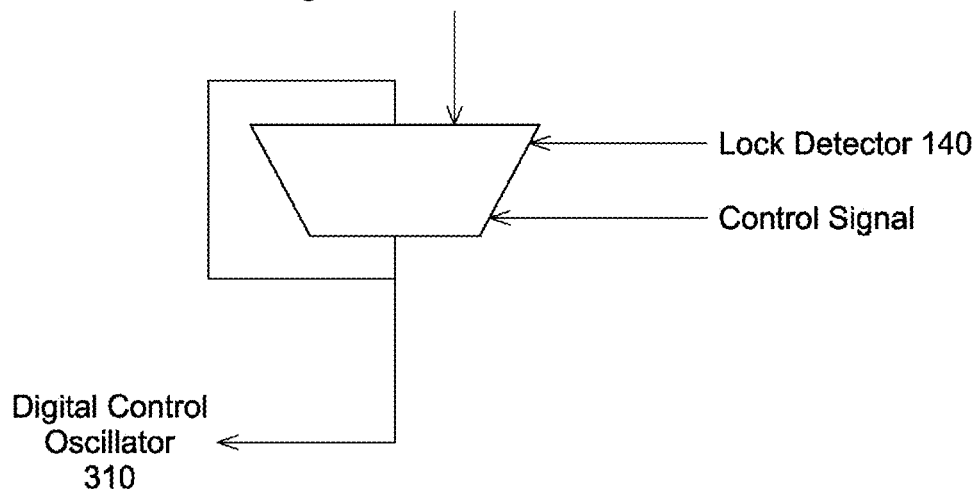
FIG. 8 and FIG. 9 illustrate examples of a transmission clock configurator shown in FIG. 2 to FIG. 4 and FIG. 6.
Figure 9:
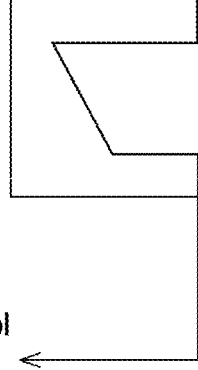

FIG. 8 and FIG. 9 illustrate examples of the transmission clock configurator shown in FIG. 2 to FIG. 4 and FIG. 6.

Referring to FIG. 8, the transmission clock configurator 200 may be realized using a 2:1 multiplexer having 2 inputs. A first input terminal of the multiplexer is connected to the time-to-digital converter 120, the digital filter 160 or the sigma-delta converter 210 to have the digital control oscillator code inputted thereto. A second input terminal of the multiplexer is connected to an output terminal of the multiplexer to have the outputted digital control oscillator code re-inputted thereto. By this connection structure, the digital control oscillator code may be provided to the second digital control oscillator 310 even when the receiver 100 is turned off and the digital control oscillator code is not provided. The control signal provided by a downstream control circuit may function as an enable signal for turning on or off the multiplexer or function with the locking detection signal to select the input terminal of the multiplexer.

In an embodiment, the signal for selecting the input terminal of the multiplexer may be the locking detection signal provided by the lock detector 140. The first input terminal may be selected by the locking detection signal. In the meantime, the multiplexer may be configured to basically select the second input terminal if no locking detection signal is inputted. Accordingly, the digital control oscillator code may not be provided to the second digital control oscillator 310 until the locking detection signal is provided. Moreover, even if the lock detector 140 is included in the receiver 100 and is turned off, the digital control oscillator code corresponding to the locking detection signal may be continuously provided to the second digital control oscillator 310.

In another embodiment, the signal for selecting the input terminal of the multiplexer may be a combination of the locking detection signal and the control signal. Connected to the multiplexer for this may be a logic circuit (not shown) that receives the locking detection signal and the control signal, performs a logical operation of the received locking detection signal and control signal and then inputs the logical-operated locking detection signal and control signal to the multiplexer.

Referring to FIG. 9, the transmission clock configurator 200 may be configured with a latch that stores the digital control oscillator code. By having the digital control oscillator code stored in the latch, the digital control oscillator code corresponding to the locking detection signal may be provided to the second digital control oscillator 310 even if the receiver 100 is turned off before an operation for providing the transmission clock is commenced or the transmitter 300 is turned on.

Meanwhile, although it is illustrated that an output terminal of the latch is connected to the first input terminal of the multiplexer shown in FIG. 8, it is also possible that the multiplexer is omitted by having the input and output to and from the latch controlled by a control circuit or the multiplexer may be substituted with a simple circuit element, for example, a switch.

Figure 10:
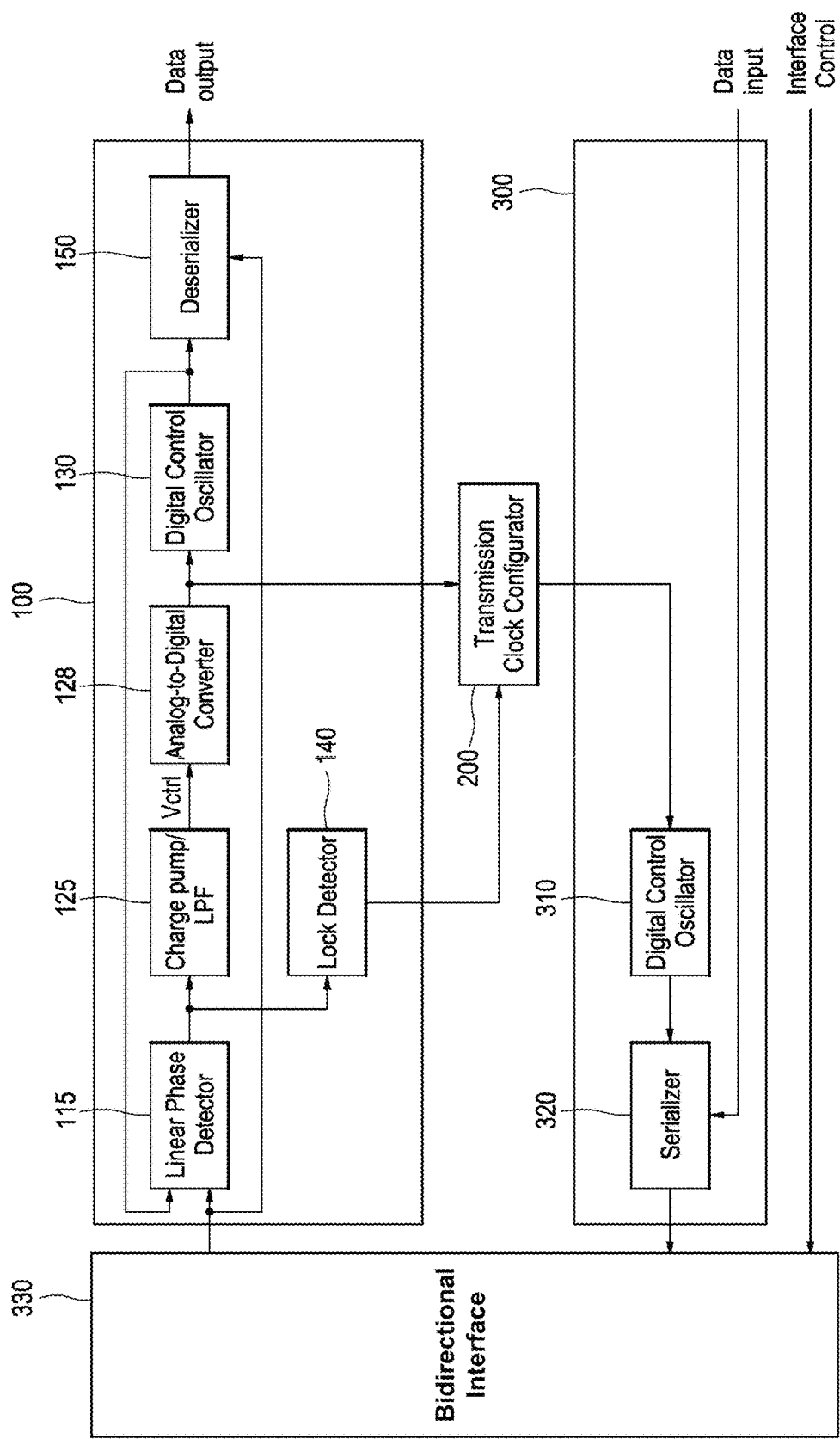
FIG. 10 illustrates another example of device for generating a clock of a sink.
Figure 11:
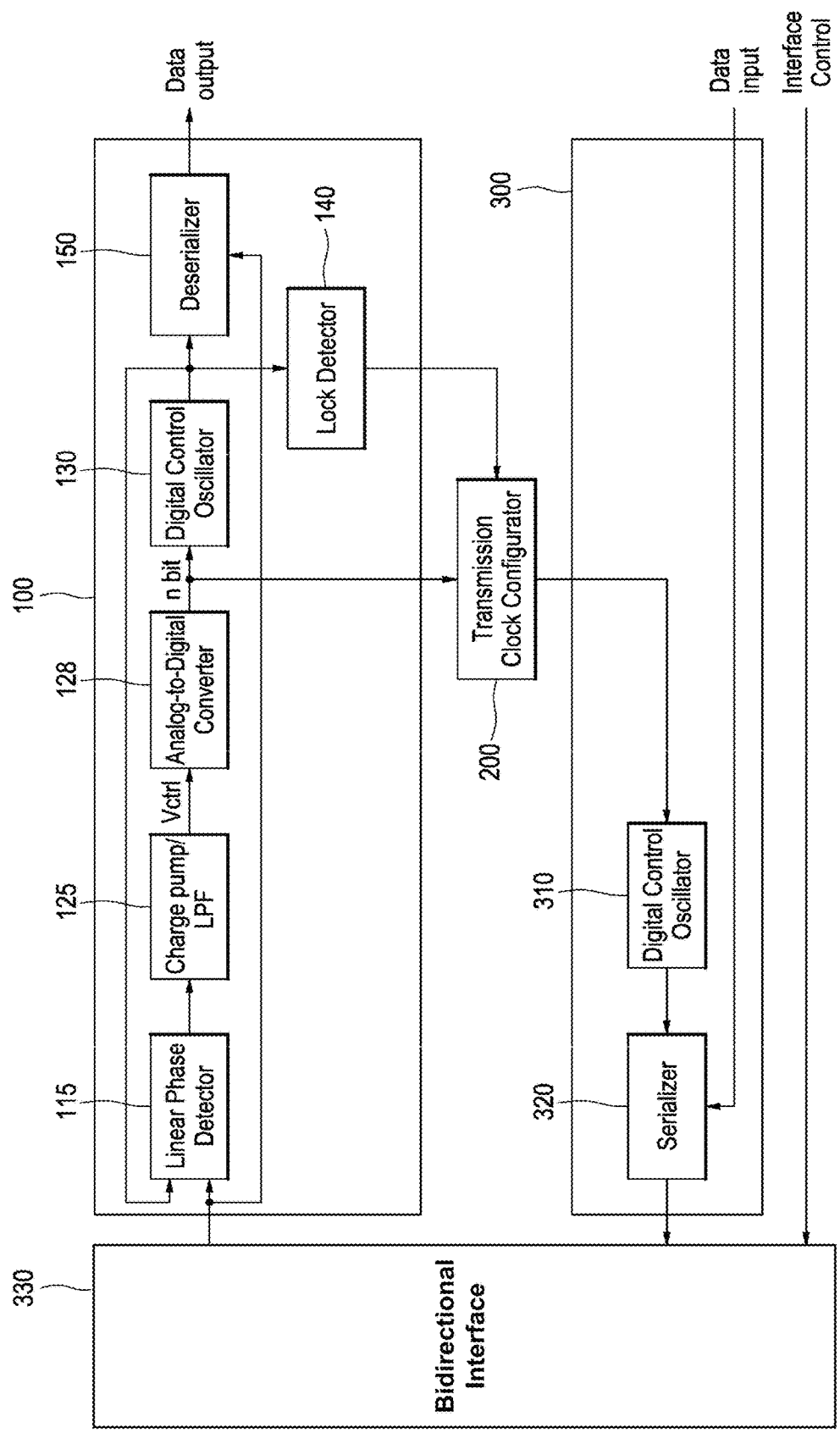
FIG. 11 illustrates another example of device for generating a clock of a sink.

FIG. 10 illustrates another example of device for generating a clock of a sink, and FIG. 11 illustrates yet another example of device for generating a clock of a sink.

Referring to FIG. 10 and FIG. 11, the sink is mainly constituted with a receiver 100 and a transmitter 300 and electrically communicably connected with a source through a bidirectional interface. The receiver 100 generates a digital control oscillator code using a phase difference between a reception clock and a recovered clock of a data signal received from the source, and recovers data from the data signal using the recovered clock, which is recovered by the generated digital control oscillator code. The transmitter 300 generates a transmission clock using the digital control oscillator code, in which the recovered clock is locked to the reception clock, and transmits return data to the source using the transmission clock.

The device for generating a clock of a sink includes a linear phase detector 115, a charge pump/LPF 125, a first digital control oscillator 130, a lock detector 140, a transmission clock configurator 200 and a second digital control oscillator 310.

The linear phase detector 115 detects a phase difference between the reception clock and the recovered clock. By comparing a phase of the reception clock of the data signal inputted through the bidirectional interface 330 with a phase of the clock recovered using the reception clock, a detected phase difference is outputted to indicate whether the phase of the recovered clock is behind or ahead of the reception clock. Here, the data signal may include at least one of a main training pattern or a mini training pattern. Hogge Phase Detector, which is a typical linear phase detector, has two of simple phase detectors connected therein, each simple phase detector consisting of a D-flip-flop and an XOR gate, but the structure of the linear phase detector is not restricted to what is described herein, and various configurations of linear phase detector may be applied hereto. The linear phase detector 115 compares the phase difference of the data signal and the recovered clock and generates, for example, an up signal pulse (UP) and a down signal pulse (DN) having a width in proportion to the phase difference.

The charge pump/LPF 125 includes a charge pump and a low pass filter and is connected to an output terminal of the linear phase detector 115. The charge pump/LPF 125 outputs a control voltage Vctrl based on the detected phase difference. In an example of the simplest configuration, the charge pump may by constituted with, but not limited to, two constant current sources and two switches controlling supply of current by the constant current sources. The current supplied by each of the constant current sources is changed by the switch being switched by the up signal pulse (UP) and the down signal pulse (DN) outputted from the linear phase detector 115. Similarly, in an example of the simplest configuration, the low pass filter may be, but not limited to, an RC filter constituted with a combination of a resistor and a capacitor connected to an output terminal of the charge pump. Triggered by the up signal pulse (UP) and the down signal pulse (DN), the charge pump may carry out, for example, a pull operation, which absorbs an electric charge from the capacitor included in the low pass filter, or a push operation, which supplies an electric charge. The control voltage Vctrl outputted from the low pass filter may be lowered by the pull operation of the charge pump, and may be raised by the push operation.

An analog-to-digital converter 128 converts the control voltage Vctrl to a digital control oscillator code having n bits. Therefore, digital control oscillator codes having different values may be continuously outputted until the first digital control oscillator 130 is locked. Once the first digital control oscillator 130 is locked, the analog-to-digital converter 128 may output a substantially constant digital control oscillator code. Here, being substantially constant means that the digital control oscillator code varies within a tolerable error range (margin).

Figure 12:
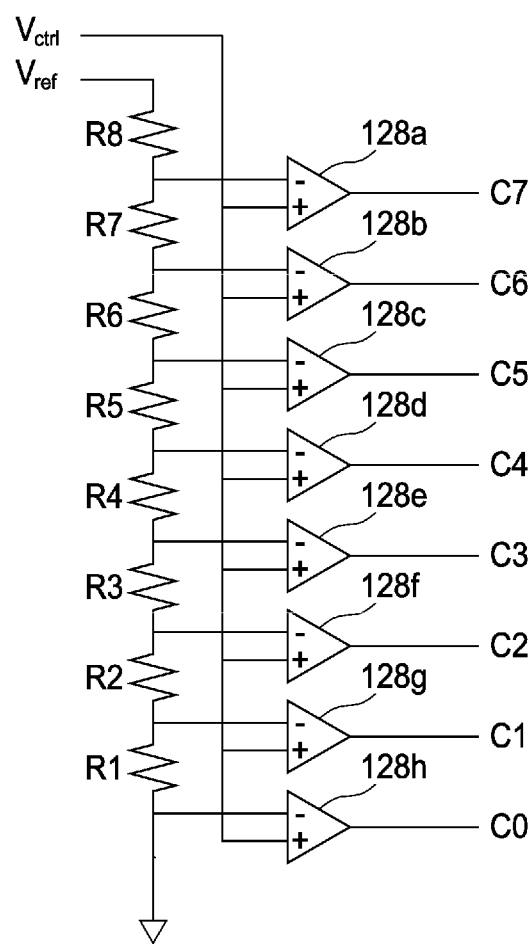
FIG. 12 illustrates an example of an analog-digital converter shown in FIG. 10 and FIG. 11.

Meanwhile, the analog-to-digital converter 128 may be designed to have various configurations. FIG. 12 illustrates an example of an analog-digital converter. The analog-to-digital converter 128 illustrated in FIG. 12 is capable of converting the control voltage Vctrl to a digital control oscillator code having 8 bits, but the number of bits of the digital control oscillator code may be increased for a precise control. The analog-to-digital converter 128 may be constituted with 8 resistors R1 to R8 for voltage distribution of reference voltage Vref and 8 comparators C0 to C7 (128a to 128h) for comparing the control voltage and the voltage-distributed reference voltage Vref. Each of R1 to R8 has a same resistance value and voltage-distributes Vref to ⅛. Here, Vref may be determined by considering a maximum value of Vctrl. The comparators C0 to C7 compares the inputted control voltage Vctrl with the distributed Vref to output a highest bit C7 to a lowest bit C0, respectively. The outputted C7 to C0 may constituted the digital control oscillator code having 8 bits. Although not illustrated in FIG. 12, the analog-to-digital converter 128 may further include a code converter for converting the outputted C7 to C0 to a digital control oscillator code for controlling the first and second digital control oscillators.

The first digital control oscillator 130 is connected to an output terminal of the analog-to-digital converter 128 and outputs the recovered clock that is recovered using the digital control oscillator code. The first digital control oscillator 130 has the frequency of the clock increased or decreased according to the n bits of digital control oscillator code. For example, if a digital control oscillator code having 8 bits is used, the digital control oscillator may output a clock having a maximum of 256 different frequencies. Meanwhile, the digital control oscillator may be designed to have various configurations. For example, the digital control oscillator may be configured in a way that the output of the oscillator is directly controlled using a digital input as a switch. It shall be also appreciated that the digital control oscillator may be realized using various ways.

The lock detector 140 outputs a locking detection signal if the recovered clock matches with the reception clock. Various methods may be applied for determining whether the recovered clock matches with the reception clock. In the case where the lock detector 140 is connected to the output terminal of the linear phase detector 115, as shown in FIG. 10, the up signal pulse UP and the down signal pulse DN are outputted with a specific pattern if the clock recovered by having the first digital control oscillator 130 locked substantially matches with the reception clock. For instance, the lock detector 140 may output a locking detection signal if the up signal pulse UP and the down signal pulse DN are outputted with short pulses or not outputted or if the up signal pulse UP and the down signal pulse DN are outputted with a same phase during a same time. In the case where the lock detector 140 is connected to an output terminal of the first digital control oscillator 130, as shown in FIG. 11, the lock detector 140 may output a locking detection signal if the reception clock and the clock recovered by the first digital control oscillator 130 are compared and determined to be matched with each other, if the first digital control oscillator 130 is locked. For instance, if a rising edge of the reception clock is compared and found to be matched with a rising edge of the recovered clock, the lock detector 140 may determine that locking has occurred. In another example, the lock detector 140 may determine the locking by counting the number of matched phases of the rising edges of the reception clock and the recovered clock. It shall be appreciated that the locking may be determined using other various ways. Moreover, in the case where the lock detector 140 is connected to the output terminal of the analog-to-digital converter 128, the lock detector 140 may output a locking detection signal if the digital control oscillator code is substantially fixed.

Although it is illustrated that the locking detection signal is directly provided to the transmission clock configurator 200 from the lock detector 140, this is merely an example for the convenience of understanding, and the locking detection signal may be provided by itself or with a control signal by way of a control circuit (not shown) of the sink.

A deserializer 150 deserializes a serial data signal inputted through the bidirectional interface using the recovered clock. Here, the data signal may include a return data request identifier REQUEST. The deserialized data is outputted to the control circuit of the sink. The control circuit of the sink does not only process the deserialized data but also control operations of the receiver 100, the transmission clock configurator 200 and the transmitter 300. Here, the control circuit of the sink transmits the return data to the source through the transmitter 300 by the return data request identifier REQUEST.

The transmission clock configurator 200 is placed between the receiver 100 and the transmitter 300 and provides the digital control oscillator code to the second digital control oscillator 310 placed in the transmitter 300. The transmission clock configurator 200 may provide the digital control oscillator code to the second digital control oscillator 310 once the locking detection signal is received from the lock detector 140. In the meantime, in order to prevent power loss caused by the transmitter 300 or to prevent a noise from occurring in a transmission medium connected by the bidirectional interface, the control circuit of the sink may turn off the transmitter 300 during a receiving operation and turn off the receiver 100 during a transmitting operation. The transmission clock configurator 200 may be triggered by a combination of the locking detection signal and the control signal from the control circuit to provide the digital control oscillator code to the second digital control oscillator 310. An example and operation of the transmission clock configurator 200 are identical with the description with reference to FIG. 5.

The second digital control oscillator 310 provides the transmission clock. The second digital control oscillator 310 outputs the transmission clock using a digital control oscillator code corresponding to the locking detection signal. For instance, The second digital control oscillator 310 and the first digital control oscillator 130 may have a same structure. Accordingly, triggered by a digital control oscillator code configured to have a locking detection signal outputted, the second digital control oscillator 310 and the first digital control oscillator 130 may output an identical clock.

A serializer 320 serializes and outputs the return data inputted by the control circuit. The outputted return data is transmitted to the source through the bidirectional interface. The control circuit of the sink transmits the return data to the source through the serializer 320.

A bidirectional interface 330 controls a direction of data transmission between the source and the sink. The bidirectional interface 330 stops transmission of the return data from the sink to the source if a data signal is received from the source, and stops reception of data signals from the source to the sink if the return data is transmitted from the sink. The direction of data transmission of the bidirectional interface 330 is determined by the control signal of the control circuit of the sink. Here, the control circuit of the sink is triggered by the return data request identifier REQUEST received from the source to allow the bidirectional interface 330 to transmit the return data from the sink to the source.

Figure 13:
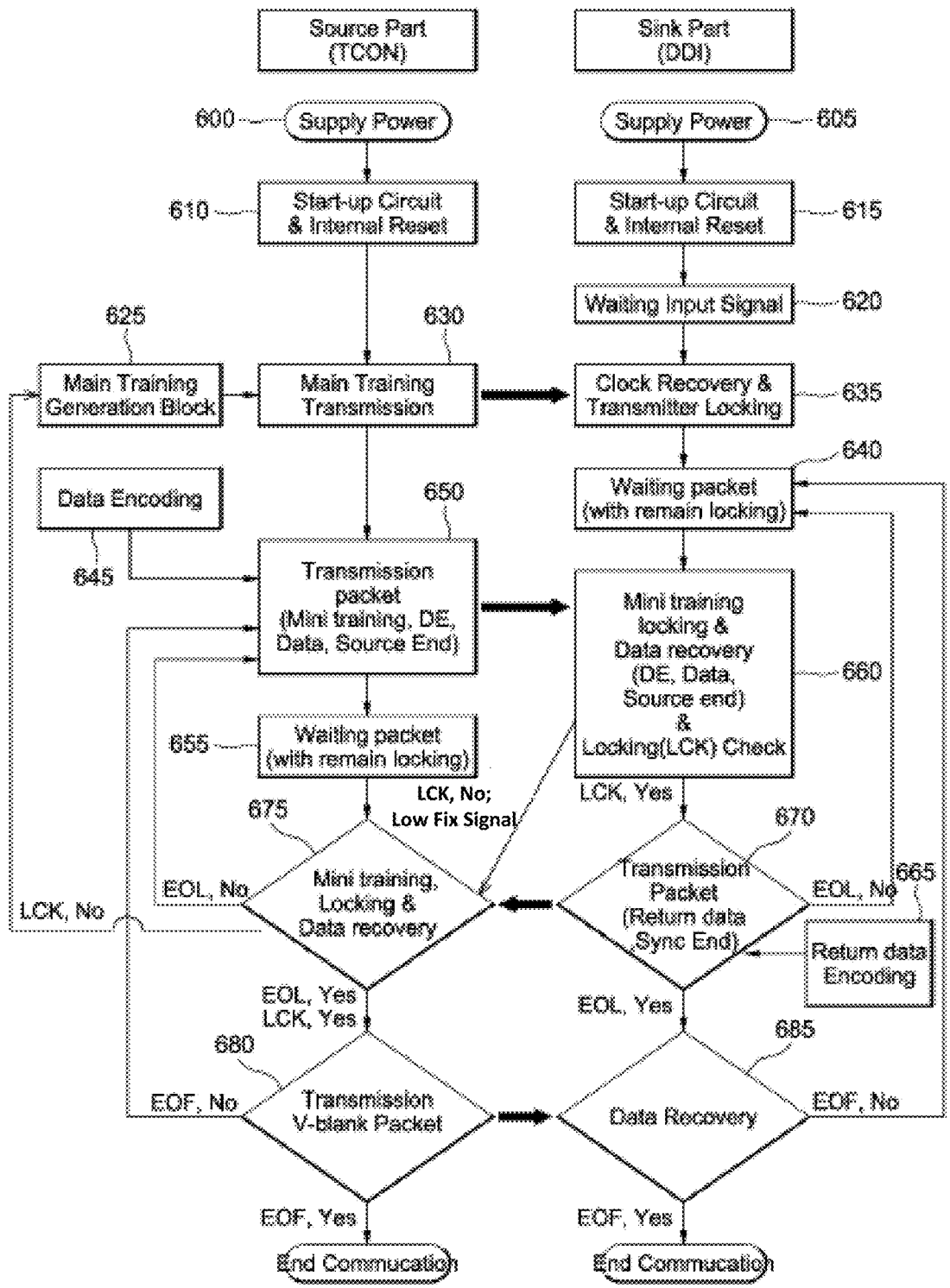
FIG. 13 is a flow diagram illustrating an example of data transmission between the source and the sink.

FIG. 13 is a flow diagram illustrating an example of data transmission between the source and the sink. In FIG. 13, a timing controller and a data driver of a display are illustrated as the source and the sink, respectively, but this is merely an example, and the present disclosure is not necessarily restricted to what is illustrated herein.

The return data is transmitted from the sink to the source in the return data transmission section, and in FIG. 13, the return data transmission section is a blank section. During the blank section, the direction of data transmission is changed in the channel so that data may be transmitted by the sink only. Although varied depending on the data transmission method, the blank section may occur at least once while data signals are communicated between the source and the sink. The blank section may have a particular length depending on the data transmission method. The blank section is relatively shorter than a section in which data signals are transmitted. Nevertheless, by configuring the size of the return data to be smaller than the blank section, bidirectional communication may be possible simultaneously without affecting a data transmission efficiency between the source and the sink. Even if the return data is bigger than the blank section, the return data may be split-transmitted using a following blank section, thereby little affecting the data transmission efficiency between the source and the sink. Moreover, if the return data is bigger than the blank section, the transmission speed of data may be increased.

In steps 600 and 605, power is supplied and is converted into internal power, which is supplied to the timing controller and the data driver.

In steps 610 and 615, once the internal power is supplied, start-up circuits are driven to start the timing controller and the data driver, respectively. The timing controller and the data driver are internally reset and initialized by the start-up circuits.

In step 620, the initialized data driver waits for a data signal from the timing controller.

In step 625, a main training generation block generates a main training pattern required for the data driver to recover a clock and data from the data signal. The main training pattern is a training pattern required for the data driver to recover a clock.

In step 630, the timing controller transmits the main training pattern generated by the main training generation block to the data driver. The main training pattern is transmitted through a channel connected between the timing controller and the data driver. Here, if any one of the timing controller and the data driver is transmitting the data signal, the other of the timing controller and the data driver cannot transmit a data signal. The direction of data transmission between the source and the sink may be controller by the bidirectional interface 330. That is, while the timing controller is transmitting the data signal, the bidirectional interface 330 may prevent the return data outputted from the transmitter 300 from being transmitted to the timing controller.

In step 635, once the main training pattern is received from the timing controller, the data driver recovers a clock by running a main training and prepares for transmission. Using the main training pattern, the data driver recover a reception clock of the received data signal. Once the reception clock is recovered, the second digital control oscillator 310 of the transmitter 300 may generate a transmission clock that is identical with the recovered clock. Additionally, during the main training, the data driver may match the phase of the recovered clock with the phase of the reception clock. Since there may be a phase difference between the reception clock and the recovered clock even though their clock frequencies are substantially the same within an error range, the data driver may recover a clock having a frequency of the reception clock and at the same time reduce the phase difference between the reception clock and the recovered clock within the error range.

In step 640, once the main training is completed, the data driver waits for transmission of the data signal from the source.

In step 645, data to be outputted to a display are encoded, independently from the main training that is run by the data driver.

In step 650, the timing controller transmits the data signal to the data driver. In the display, an image is constituted with a plurality of frames, which are constituted with data encoded for controlling pixels of the display. The data signal transmitted by the timing controller includes the mini training pattern, data enable (DE), encoded data and source end. The data signal may be transmitted in the form of a packet. The mini training pattern is a training pattern required for a receiving side, which receives the mini training pattern, to run the mini training that adjusts the phase of the recovered clock, and the data enable is information for identifying the pixel that will receive the encoded data. The source end is a modification of the transmission completion identifier DONE, which indicates that transmission of the data signal from the timing controller is completed. Here, the display includes a pixel array constituted with n lines, each having m pixels ranged therein, and the source end may indicate that transmission of the encoded data to the pixels located in the n-th line is completed. The source end may instruct a start of an H-blank section or a V-blank section, and each frame may include a plurality of blank sections.

In step 655, after transmitting the data signal to the data driver, the timing controller waits for transmission of the return data from the data driver.

In step 660, once the data signal is received, the data driver runs the mini training, recovers data and checks for a locking state. Using the received mini training pattern, the data driver adjusts the phase of the recovered clock to match with the phase of the reception clock. The data driver may also run the mini training if the encoded data are received to pixels located in a new line after the phase of the recovered clock recovered in the main training is matched with the phase of the reception clock or the blank section is completed. The data driver checks for the locking state of the receiver 100. If the receiver 100 is checked and found not to be locked, a Low Fix signal is transmitted to the timing controller. If the source end is included in the recovered data, the data driver transmits the Low Fix signal to the timing controller in the blank section.

In step 665, the data driver encodes the return data. The return data includes the mini training pattern and locking data. The locking data indicates a locking state of the sink, for example, as 1 for a locked state and as 0 for an unlocked state or a lock-released state.

In step 670, if the source end is included in the recovered data, the data driver transmits the return data to the timing controller during the blank section. The timing controller cannot transmit data until the blank section is terminated after the data driver transmits the return data. During this section, the data driver may transmit no signal or transmit meaningless data. Once the blank section is terminated, the data driver may transmit a sync end to the timing controller to allow the timing controller to transmit the data signal to pixels located in a next line. The sync end is a modification of the transmission completion identifier DONE, which indicates that transmission of the data signal to the data driver is completed.

In step 675, once the return data is received, the timing controller runs the mini training, recovers the data, and checks for a locking state of the timing controller. A next step of the timing controller is varied based on the locking state of the receiver 100 of the data driver. Although the transmission clock used by the data driver for transmission of the return data is substantially the same as the reception clock, a new phase difference may be occurred due to channel characteristics. Accordingly, the timing controller may precisely recover the return data by removing the newly occurred phase difference by running the mini training.

If the Low Fix signal is transmitted from the data driver, the data driver is in an unlocked state. Accordingly, the timing controller returns to the step 625 to generate the main training pattern again. Then, the steps 630 to 660 are carried out.

If the return data is received from the data driver but the data signal for the line being currently transmitted to has not been completed (EOL (END OF LINE), No), the timing controller returns to the step 650 to transmit the encoded data for all pixels located in the line being currently transmitted to or for remaining, untransmitted pixels to the data driver.

If the return data is received from the data driver and the data signal for the line being currently transmitted to has been completed (EOL (END OF LINE), Yes), the timing controller performs step 680.

In the step 680, the timing controller checks whether the transmission of frames is completed and transmits a V-blank data signal to the data driver. If the transmission of frames is completed (EOF (END OF FRAME), Yes), the timing controller notifies through, for example, the V-blank data signal that communication is terminated. If there are frames to be transmitted (EOF, No), the timing controller returns to the step 650.

In step 685, the data driver determines whether the transmission of frames is completed, by recovering the V-blank data signal received from the timing controller. If the transmission of the frames is not completed (EOF, No), the data driver returns to the step 640. If the transmission of frames is confirmed to be completed (EOF, Yes) by receiving the V-blank data signal, the communication with the timing controller is terminated.

Figure 14:
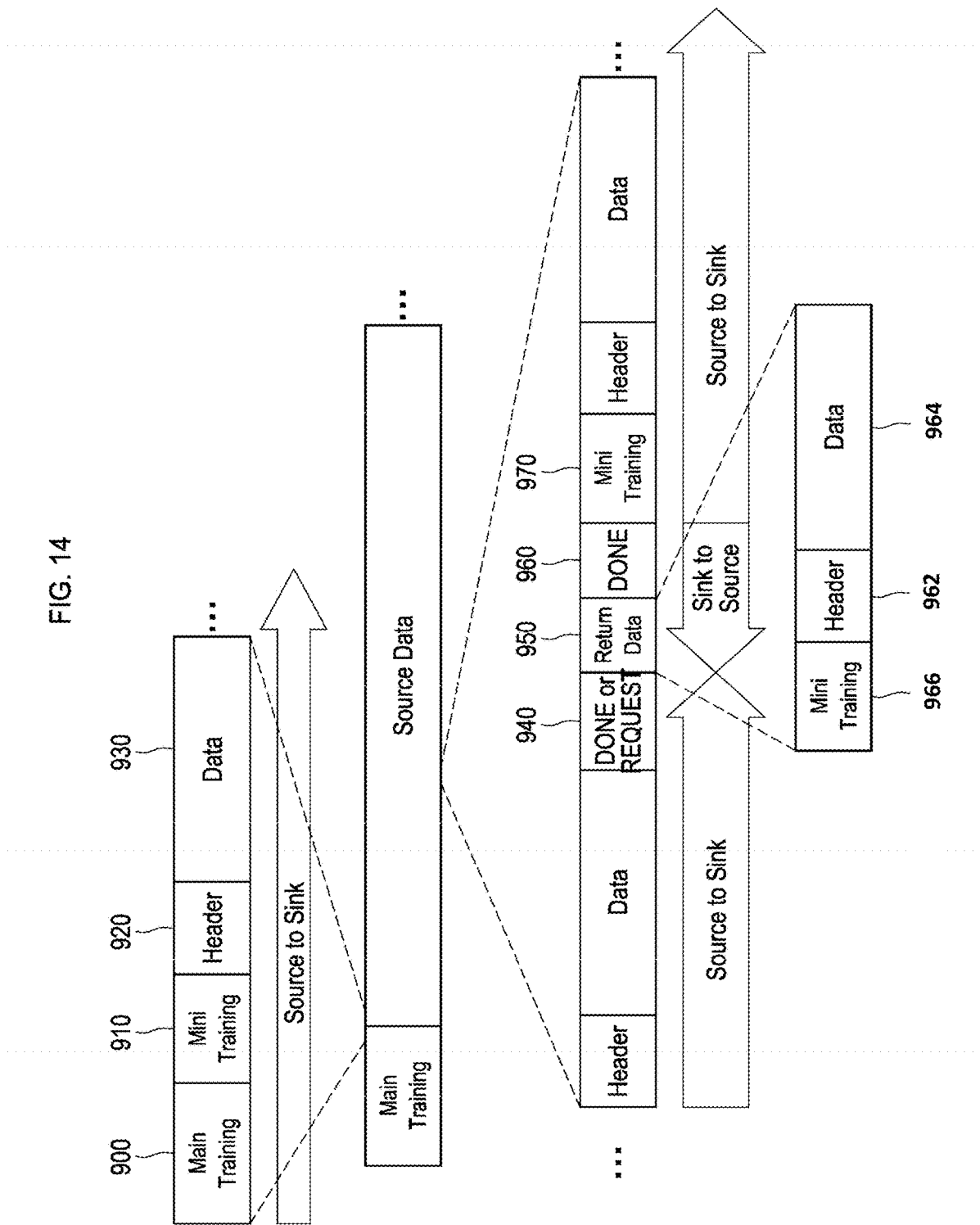
FIG. 14, FIG. 15, FIG. 16 and FIG. 17 illustrate structures of data signals transmitted between the source and the sink.
Figure 15:
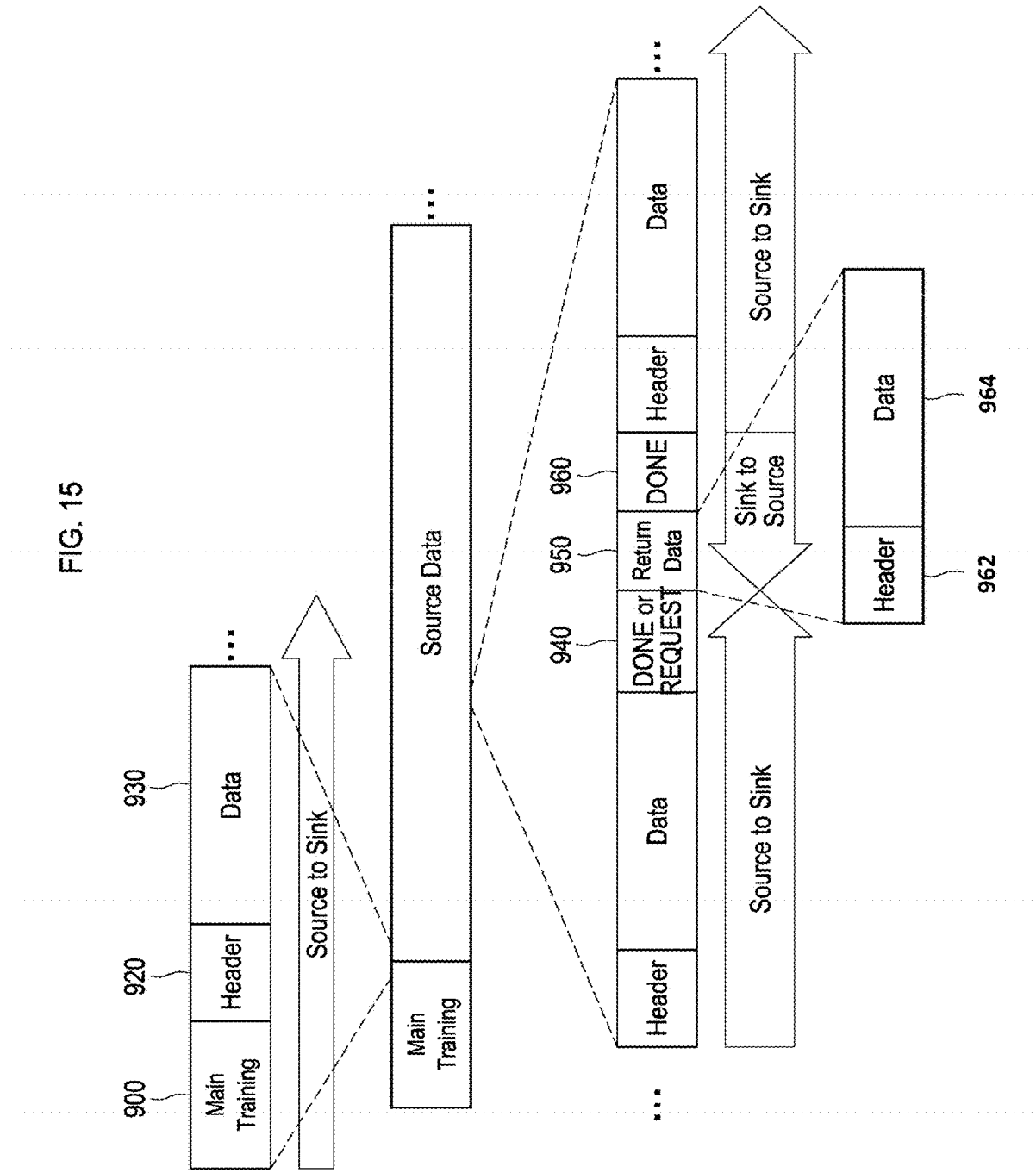
Figure 16:
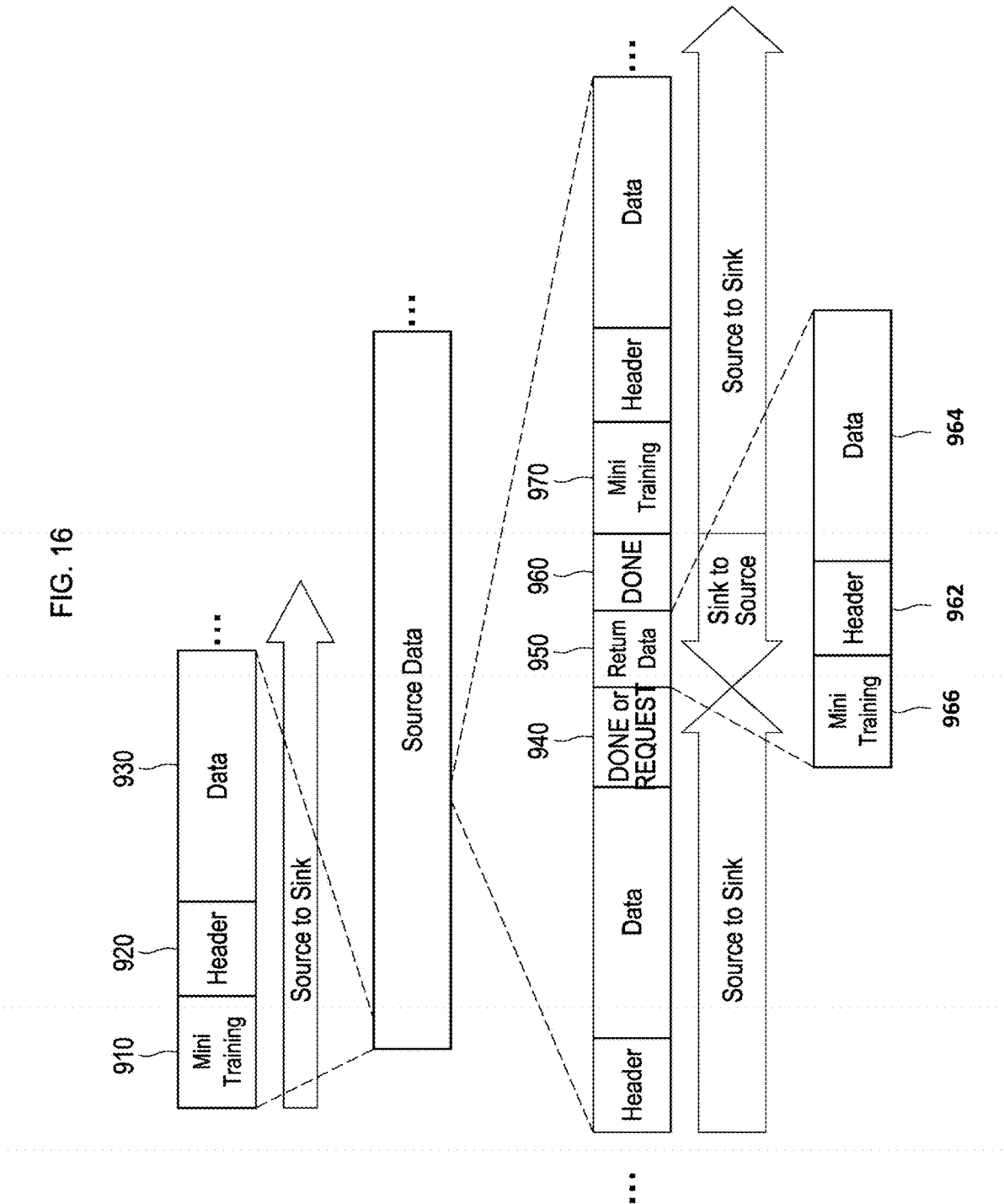

FIG. 14 to FIG. 16 illustrate structures of data signals transmitted between the source and the sink.

FIG. 14 shows the structure of a data signal including both a main training pattern 900 and a mini training pattern 910, FIG. 15 the structure of a data signal including the main training pattern 900, and FIG. 16 the structure of a data signal including the mini training pattern 910. The main training pattern 900 is used for the main training for recovering the reception clock, and the mini training pattern 910 is used for the mini training for matching the phase of the recovered clock with the phase of the reception clock. Depending on the structure of the receiver 100 of the sink and/or the data transmission method, any one of the main training and the mini training may be omitted. In other words, the data signal does not necessarily have to have any one of the structures shown in FIG. 14 to FIG. 16.

Figure 17:
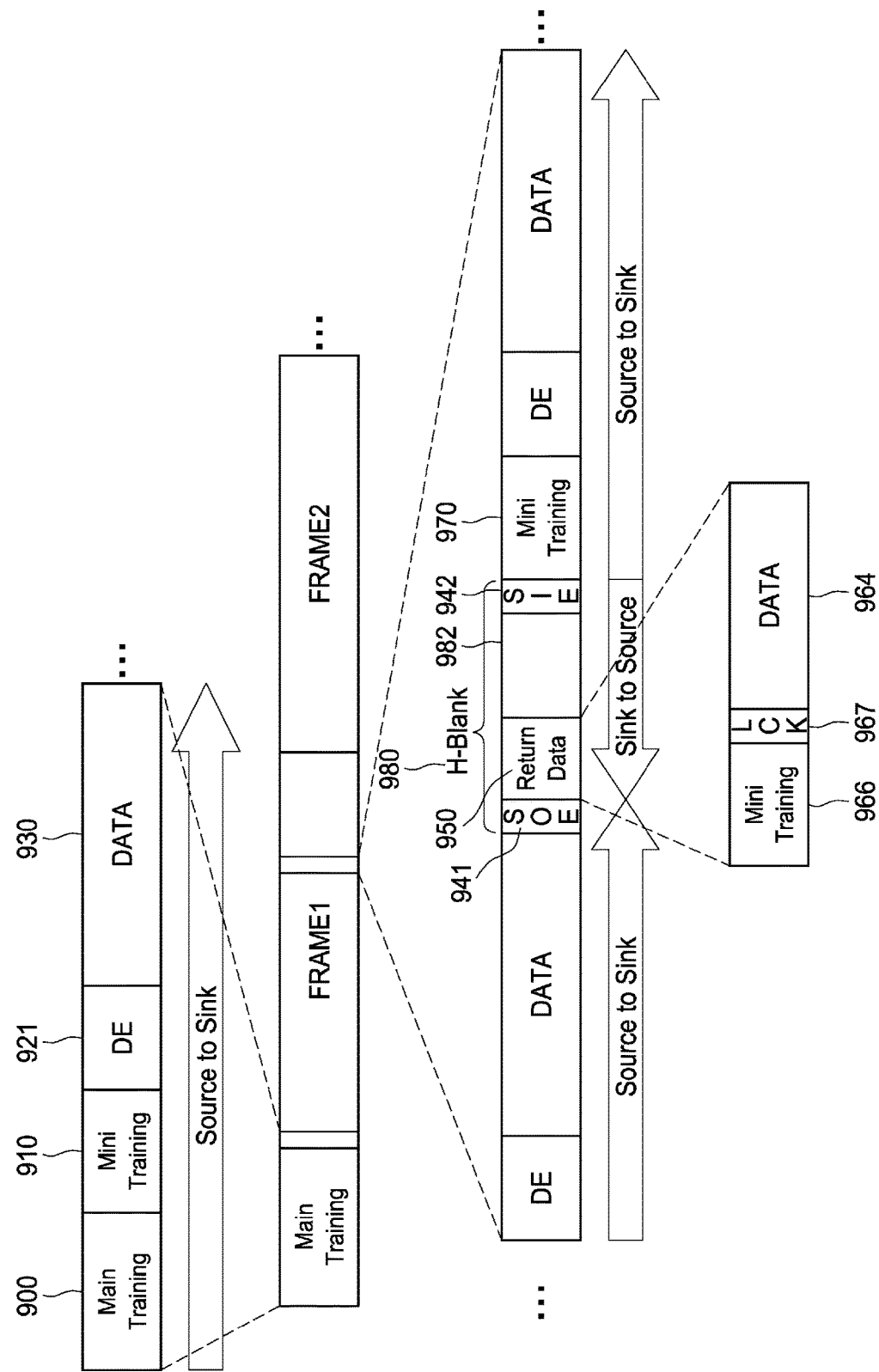

In various applications, there are occasions in which the sink needs to transmit the return data to the source. For example, a touch screen needs to transmit a touch made by a user to an application processor. In another example, which is illustrated in FIG. 17, the data driver may transmit status information to the timing controller. Conventionally, an additional channel has been needed in order to transmit data from the sink to the source, but no additional channel is required if a method of transmission using a transmission clock is used.

The data signal transmitted by the source is constituted with source data and the main training pattern 900 for allowing the sink to recover the reception clock. The main training pattern 900 is first to be transmitted to the sink when communication between the source and the sink is commenced. Meanwhile, as illustrated in FIG. 16, in the case where the since has already recovered the reception clock or where the reception clock can be recovered without the main training pattern 900, the transmission of the main training pattern 900 may be omitted. Afterwards, the source data is transmitted to the sink.

After the main training pattern 900 is transmitted, the mini training pattern 910, which is for allowing the sink to match the phase of the recovered clock to the reception clock, is transmitted. Meanwhile, as illustrated in FIG. 15, in the case where the sink has already matched the phase of the reception clock or where the phase of the reception clock can be matched without the mini training pattern 910, the transmission of the mini training pattern 910 may be omitted. Moreover, in the case where the transmission of the source data is temporarily stopped by the return data request identifier REQUEST, the transmission of the mini training pattern 910 may be omitted. After the mini training pattern 910 is transmitted, the source data is transmitted to the sink. The source data may be varied depending on the application to which the source and the sink are applied, and, for example, may be constituted with a plurality of frames in the case of a display. In FIG. 14 to FIG. 16, the source data includes header 920 and data 930. The header 920 indicates the beginning of the data 930 and may selectively include information on the data, for example, the size of the data. At least one or more source data, each being constituted with the header 920 and the data 930, are transmitted to the sink until the transmission completion identifier DONE or the return data request identifier REQUEST 940 is transmitted.

Once the last source data is transmitted, the source transmits the transmission completion identifier DONE to the sink. Meanwhile, the source transmits the return data request identifier REQUEST to the sink periodically or when necessary before the last source data is transmitted. Once the transmission completion identifier DONE or the return data request identifier REQUEST 940 is received, the bidirectional interface 330 of the sink permits transmission of the return data from sink to the source.

The return data transmission section is started by the transmission completion identifier DONE or the return data request identifier REQUEST 940 transmitted by the source, and the return data transmission section is terminated by the transmission completion identifier DONE transmitted by the sink. In other words, return data 950 is located in the return data transmission section. Referring to FIG. 14, the return data 950 includes mini training 966, header 962 and option data 964 and may additionally include locking data. The locking data indicates a locking state of the sink and may be included in the header 962 or the option data 964. The header 962 includes at least one of a size of the header, a size of the option data and a combination thereof. The option data 964 is data to be transmitted from the sink to the source and may be variously configured with, for example, status information of the sink (e.g., locking state), a sensing value of a sensor connected to the sink and/or a touch of a user sensed by a touch screen, depending on the type of application.

A length of the return data transmission section may vary depending on the type of application and/or the method of transmitting data. In the meantime, the length of the return data transmission section may be the same for identical applications and/or identical methods of transmitting data.

The length of the return data transmission section may be defined by the source or the sink. In the case where the length of the return data transmission section is defined by the source, the source may have, for example, a transmission permitted time, in which the sink may transmit the return data 950, and a transmission permitted size, by which the sink may transmit the return data 950, included the transmission completion identifier DONE or the return data request identifier REQUEST 940. Accordingly, the source may stop transmitting the data signal during the transmission permitted time or until the transmission permitted size of return data 950 is completely received. Meanwhile, the sink may transmit the return data 950 to the source during the transmission permitted time or transmit the return data 950 in the transmission permitted size or less to the source.

In the case where the length of the return data transmission section is defined by the sink, the sink may have, for example, a transmission capable time, in which the option data 964 is to be transmitted, and a transmission size, in which the option data 964 is to be transmitted, included in the header 962. Accordingly, the source may stop the transmission of the data signal during the transmission capable time or until the transmission size of return data 950 is completely received.

Meanwhile, in the case where there is no return data to be transmitted to the source, the sink may have the no return data identifier NO RETURN DATA included in any one of the header and the option data or transmit the no return data identifier NO RETURN DATA to the source in lieu of the header and the option data. Additionally, the sink may transmit a transmission completion identifier DONE 960 to the source after transmitting the no return data identifier NO RETURN DATA.

Once the return data transmission section is terminated, the sink transmits the transmission completion identifier DONE 960 to notify the source that there is no more return data to be transmitted. Once the transmission completion identifier DONE 960 is transmitted, the bidirectional interface 330 of the sink permits reception of the data signal from the source.

Once transmission completion identifier DONE 960 is received, the source transmits a mini training pattern 970 and then source data to the sink.

FIG. 17 illustrates the structure of a data signal transmitted between the source and the sink. Although FIG. 17 shows that the data signal is transmitted between a timing controller and a data driver of a display, this is merely an example, and the present disclosure is not necessarily restricted to what is illustrated herein. The return data transmission section illustrated in FIG. 17 is a blank section.

The data signal transmitted by the timing controller is constituted with a main training pattern 900, which is for recovering a clock of the data driver, and a plurality of frames. The number of frames may be greater, depending on an image to be outputted through the display, but the present disclosure is described with 2 frames, for the convenience of description. The main training pattern 900 is first to be transmitted to the data driver when communication between the timing controller and the data driver is commenced. Afterwards, the frames are transmitted to the data driver. After the main training pattern 900 is transmitted, a mini training pattern 910, which is for allowing the data driver to match the phase of the recovered clock to the reception clock, is transmitted. After the mini training pattern 910 is transmitted, data enable 921 and encoded data 930 are transmitted to the data driver until the source end is transmitted.

Once the data enable and the encoded data for a last pixel of a line is transmitted, the timing controller transmits source end 941 to the data driver. Once the source end 941 is received, the bidirectional interface 330 of the data driver permits transmission of data from the data driver to the timing controller.

The source end 941 indicates the start of an H-blank section 980, and a sink end 942 indicates the end of the H-blank section 980. Return data 950 is located in the H-blank section 980. A blank section is a section where the timing controller does not transmit any data signal, and may be, for example, an H-blank section or a V-blank section. The return data 950 includes mini training 966 and locking data 967 and may selectively further include option data 964, which is to be transmitted to the timing controller by the data driver. A length of the blank section may vary depending on the method of transmitting data, but the length of the blank section may be the same for identical methods of transmitting data. Therefore, the length of a genuinely blank section 982, in which no data is transmitted between the timing controller and the data driver, may be determined based on the size of the return data.

Once the H-blank section 980 is terminated, the data driver transmits sink end 942 to notify the timing controller that there is no more return data to be transmitted. Once the sink end 942 is transmitted, the bidirectional interface 330 of the data driver permits reception of the data signal from the timing controller.

Once the sink end 942 is received, the timing controller transmits a mini training pattern 970 and then transmits data enable and encoded data to the data driver.

Figure 18:
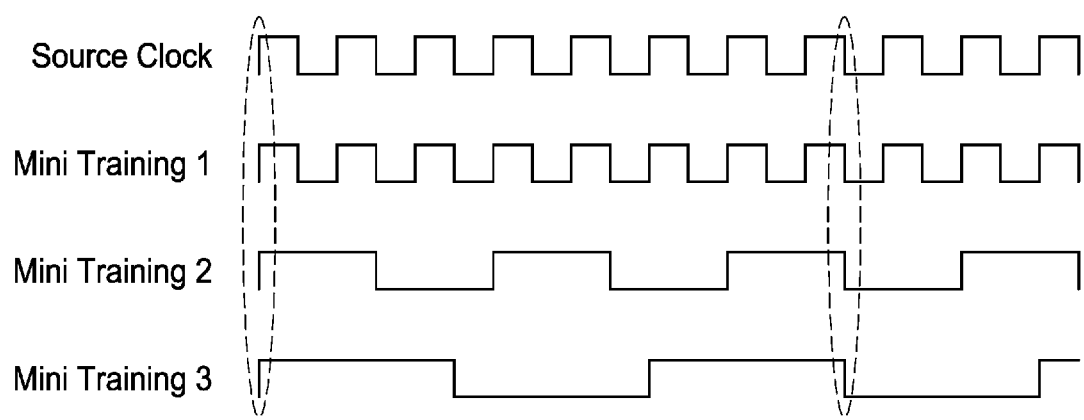
FIG. 18 illustrates mini training patterns.

FIG. 18 illustrates mini training patterns.

The mini training pattern is a training pattern required for a receiving side, which has received the mini training pattern, to run a mini training for adjusting the phase of a recovered clock. Referring to FIG. 18, 3 mini training patterns are illustrated. Compared to a main training pattern, which is for recovering a reception clock, the mini training pattern may be generated to have a simpler form than the main training pattern because the mini training pattern is used for matching the phase of the recovered clock with the phase of the reception clock. Nevertheless, the mini training pattern may have the same pattern as that of the main training pattern. In the meantime, since it is possible to allow a transmission clock to be faster than the reception clock in order to increase a transmission speed, the mini training pattern may by generated to have a pattern that is n times faster than the clock of the source, n being a natural number.

Since the return data is transmitted using the transmission clock that is generated using the recovered clock, a rising edge or a falling edge of the mini training pattern may be aligned to a rising edge or a falling edge of the transmission clock. The source that has received the mini training pattern may match the phases by comparing the rising edge or falling edge of the mini training pattern with the reception clock, which is the clock used for transmitting the data signal.

The above description is provided for illustrative purposes only, and it shall be appreciated by anyone of ordinary skill in the art to which the present invention pertains that the present disclosure may be readily modified to another specific form without changing the technical ideas or essential features of the present disclosure. Accordingly, the embodiments described hitherto shall be understood in illustrative perspectives, not restrictive perspectives, in every aspect.

The scope of the present disclosure shall be defined by the claims appended below, rather than by the above description, and it shall be interpreted that every possible modification or permutation contrived from the meaning, scope and equivalents of the claims is included in the scope of the present disclosure.

What is claimed is:

1. A sink, comprising:
    a receiver configured to:
        detect, without a reference clock, a phase difference between a reception clock of a data signal received from a source and a recovered clock;
        generate a digital control oscillator code representative of the phase difference; and
        recover data from the data signal by using the recovered clock; and
    a transmitter configured to:
        generate, without a reference clock, a transmission clock from the digital control oscillator code having the recovered clock locked to the reception clock; and
        transmit return data to the source by using the transmission clock when a return data request identifier is received from the source,
        wherein the sink is further configured to store the digital control oscillator code.

2. The sink according to claim 1, wherein the receiver comprises:
    a digital phase detector configured to detect the phase difference between the reception clock of the data signal received from the source and the recovered clock;
    a time-to-digital converter configured to generate the digital control oscillator code by using the phase difference detected by the digital phase detector; and
    a first digital control oscillator configured to output the recovered clock by using the digital control oscillator code.

3. The sink according to claim 2, wherein the transmitter comprises:
    a second digital control oscillator configured to output the transmission clock by using the digital control oscillator code; and
    a serializer configured to serialize the return data by using the transmission clock.

4. The sink according to claim 2, further comprising a lock detector configured to compare the reception clock with the recovered clock and output a locking detection signal indicating whether the first digital control oscillator is locked.

5. The sink according to claim 1, wherein the receiver comprises:
    a linear phase detector configured to detect the phase difference between the reception clock of the data signal received from the source and the recovered clock;
    a charge pump configured to convert the phase difference detected by the linear phase detector into a control voltage;
    an analog-to-digital converter configured to convert the control voltage into the digital control oscillator code; and
    a first digital control oscillator configured to output the recovered clock by using the digital control oscillator code.

6. The sink according to claim 5, wherein the transmitter comprises:
a second digital control oscillator configured to output the transmission clock by using the digital control oscillator code; and
a serializer configured to serialize the return data by using the transmission clock.

7. The sink according to claim 5, further comprising a lock detector configured to compare the reception clock with the recovered clock and output a locking detection signal indicating whether the first digital control oscillator is locked.

8. The sink according to claim 1, wherein the return data comprises a header and option data.

9. The sink according to claim 8, wherein the return data further comprises a mini training pattern.

10. The sink according to claim 1, wherein the return data is a no return data identifier.

11. The sink according to claim 1, wherein the data signal received from the source and the return data are transmitted through a same channel.

12. The sink according to claim 1, wherein the digital control oscillator code is an n-bit digital signal.

13. A method of transmitting data between a source and a sink, the method comprising:
generating, without a reference clock, a transmission clock, wherein generating the transmission clock comprises:
detecting a phase difference between a reception clock of a data signal received from the source and a recovered clock;
generating a digital control oscillator code representative of the phase difference; and
storing the digital control oscillator code;
generating, without the reference clock, the transmission clock with a digital control oscillator included in a transmitter of the sink, wherein the digital control oscillator generates, without the reference clock, the transmission clock using the digital control oscillator code; and
changing a direction of data transmission between the source and the sink and transmitting return data to the source by using the transmission clock when a return data request identifier is received from the source.

14. The method according to claim 13, further comprising:
outputting the recovered clock by using the digital control oscillator code, wherein recovered clock is outputted by a digital control oscillator included in a receiver of the sink;
comparing the reception clock with the recovered clock and determining whether the digital control oscillator included in the receiver of the sink is locked; and
providing the digital control oscillator code to the digital control oscillator included in the transmitter of the sink when the digital control oscillator included in the receiver of the sink is locked.

15. The method according to claim 13, wherein a section in which no data is transmitted by the source is started by a source end.

16. The method according to claim 13, wherein the return data comprises a header and option data.

17. The method according to claim 13, wherein the return data is a no return data identifier.

18. The method according to claim 13, wherein the return data request identifier comprises a transmission completion identifier.

19. The method according to claim 13, wherein the return data has a variable size.

20. The method according to claim 13, further comprising, after the changing of the direction of data transmission between the source and the sink and transmitting the return data to the source by using the transmission clock when a return data request identifier is received from the source, transmitting a transmission completion identifier to the source when the transmission of the return is completed.

* * * * *